(12) United States Patent
Kuchibhotla et al.

(10) Patent No.: US 10,051,621 B2
(45) Date of Patent: *Aug. 14, 2018

(54) METHOD AND APPARATUS FOR LOW LATENCY TRANSMISSIONS

(71) Applicant: Motorola Mobility LLC, Chicago, IL (US)

(72) Inventors: Ravi Kuchibhotla, Gurnee, IL (US); Robert T. Love, Barrington, IL (US); Vijay Nangia, Algonquin, IL (US); Ravikiran Nory, Buffalo Grove, IL (US); Ajit Nimbalker, Santa Clara, CA (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,839

(22) Filed: Aug. 29, 2017

(65) Prior Publication Data

US 2017/0359810 A1     Dec. 14, 2017

Related U.S. Application Data

(63) Continuation of application No. 15/013,025, filed on Feb. 2, 2016, now Pat. No. 9,801,175.

(60) Provisional application No. 62/252,092, filed on Nov. 6, 2015.

(51) Int. Cl.
*H04W 72/04*     (2009.01)
*H04L 5/00*      (2006.01)
*H04W 24/08*     (2009.01)

(52) U.S. Cl.
CPC ......... *H04W 72/044* (2013.01); *H04L 5/0007* (2013.01); *H04L 5/0053* (2013.01); *H04W 24/08* (2013.01); *H04W 72/0406* (2013.01)

(58) Field of Classification Search
CPC ........... H04W 72/044; H04W 72/0406; H04W 24/08; H04L 5/0007
See application file for complete search history.

(56) References Cited

U.S. PATENT DOCUMENTS

| 2008/0219236 A1 | 9/2008 | Love |
| 2008/0220775 A1 | 9/2008 | Willars |

(Continued)

FOREIGN PATENT DOCUMENTS

| EP | 2590350 A1 | 5/2013 |
| WO | 2015072905 A1 | 5/2015 |

OTHER PUBLICATIONS

Reilly, PCT International Search Report, International application No. PCT/US2016/058592, European Patent Office, dated Mar. 10, 2017, Rijswijk, NL.

(Continued)

*Primary Examiner* — Thai Nguyen
(74) *Attorney, Agent, or Firm* — Matthew C. Loppnow; The Watson I.P. Group, PLC

(57) ABSTRACT

A method and apparatus provide for low latency transmissions. A first control channel can be transmitted in a first temporal portion of a subframe. The subframe can include a plurality of OFDM symbols in a time domain and a plurality of subcarriers in a frequency domain. The first control channel can occupy a first portion of subcarriers less than the plurality of subcarriers. The first control channel can assign first data resources only in the first temporal portion of the subframe. A second control channel can be transmitted in a second temporal portion of a subframe. The first temporal portion can occupy at least one different first OFDM symbol in the subframe from the second temporal portion. The second temporal portion can occupy at least one different second OFDM symbol in the subframe from the first temporal portion. The second control channel can occupy a (Continued)

second portion of subcarriers that is less than the plurality of subcarriers. The second control channel can assign second data resources only in the second temporal portion of the subframe.

20 Claims, 19 Drawing Sheets

(56) References Cited

U.S. PATENT DOCUMENTS

| | | | |
|---|---|---|---|
| 2009/0316811 A1 | 12/2009 | Maeda | |
| 2010/0120442 A1 | 5/2010 | Zhuang | |
| 2010/0195566 A1* | 8/2010 | Krishnamurthy | H04L 5/0007 370/328 |
| 2012/0243515 A1 | 9/2012 | Xue | |
| 2012/0281636 A1 | 11/2012 | Xiao | |
| 2013/0044727 A1 | 2/2013 | Nory | |
| 2013/0114419 A1 | 5/2013 | Chen | |
| 2014/0036821 A1* | 2/2014 | Mcnamara | H04L 5/0007 370/329 |
| 2014/0233673 A1 | 8/2014 | Smith | |
| 2014/0254476 A1 | 9/2014 | Blankenship | |
| 2015/0180622 A1 | 6/2015 | Y00 | |
| 2015/0280871 A1 | 10/2015 | Xu | |
| 2015/0334729 A1 | 11/2015 | Ji | |
| 2015/0349929 A1 | 12/2015 | Bhorkar | |
| 2015/0358111 A1 | 12/2015 | Marinier | |
| 2016/0020891 A1 | 1/2016 | Jung | |
| 2016/0030891 A1 | 2/2016 | Oskoui | |
| 2016/0065341 A1 | 3/2016 | Yoo | |
| 2016/0066316 A1 | 3/2016 | Bhushan | |
| 2016/0100395 A1 | 4/2016 | Ku | |
| 2016/0134405 A1 | 5/2016 | Luo | |
| 2016/0143030 A1 | 5/2016 | Lee | |
| 2016/0173232 A1 | 6/2016 | Mallik | |
| 2016/0174238 A1 | 6/2016 | Chen | |
| 2016/0234857 A1 | 8/2016 | Chen | |
| 2016/0286541 A1* | 9/2016 | Webb | H04L 5/0037 |
| 2017/0251465 A1 | 8/2017 | Andersson | |
| 2017/0339217 A1 | 11/2017 | Morrill | |

OTHER PUBLICATIONS

Reilly, PCT International Search Report, International application No. PCT/US2016/059840, European Patent Office, dated Jan. 30, 2017, Rijswijk, NL.

Mediatek Inc: "UL Contention Based Access for Latency Reduction", 3GPP Draft; R2-152383 UL CB Access for Latency Reduction. 3rd Generation Partnership Project (3GPP), Mobile Competence Centre; 650, Route Des Lucioles; F-06921 Sophia-Antipolis Cedex; France, vol. RAN WG2. No. Fukuoka. Japan; May 25, 2015-May 29, 2015, May 15, 2015.

Garcia, PCT International Search Report, International application No. PCT/US2016/058836, European Patent Office, dated Jan. 30, 2017, Rijswijk, NL.

Huawei et al: "Control signaling enhancements for short TTI", 3GPP Draft; R1-156461, 3rd Generation Partnership Project (3GPP), Mobile Competence Centre; 650, Route Des Lucioles; F-06921 Sophia-Antipolis Cedex; France, vol. RAN WG1. No. Anaheim. USA; Nov. 15, 2015-Nov. 22, 2015, Nov. 15, 2015.

Ericsson: "Overview of TTI shortening", 3GPP Draft; R1-157146, 3rd Generation Partnership Project (3GPP), Mobile Competence Centre; 650, Route Des Lucioles; F-06921 Sophia-Antipolis Cedex; France, vol. RAN WG1. No. Anaheim. USA; Nov. 15, 2015-Nov. 22, 2015, Nov. 15, 2015.

Reilly, PCT International Search Report, International application No. PCT/US2016/059850, European Patent Office, dated Apr. 10, 2017, Rijswijk, NL.

Apple Inc: "On the Structure and Usage Scenarios of ePDCCH", 3GPP Draft; R1-114300, 3rd Generation Partnership Project (3GPP), Mobile Competence Centre; 650, Route Des Lucioles; F-06921 Sophia-Antipolis Cedex; France, vol. RAN WG1. No. San Francisco. USA; Nov. 14, 2011-Nov. 18, 2011, Nov. 9, 2011.

Yeung, Mang Hang, Notice of References Cited, PTO-892, U.S. Appl. No. 15/012,969, U.S. Patent and Trademark Office, filed May 22, 2017.

Cunningham, Kevin M, PTO-892, Notice of References Cited, U.S. Appl. No. 15/012,997, U.S. Patent and Trademark Office, filed Jun. 14, 2017.

Cunningham, Kevin M, PTO-892, Notice of References Cited, U.S. Appl. No. 15/013,014, U.S. Patent and Trademark Office, filed Jun. 13, 2017.

Nguyen, PTO-892, Notice of References Cited, U.S. Appl. No. 15/013,025, U.S. Patent and Trademark Office, filed Jun. 6, 2017.

Reilly, PCT International Search Report, International application No. PCT/US2016/060047, European Patent Office, dated Feb. 22, 2017, Rijswijk, NL.

Ahmed, PTO-892 Notice of References Cited, U.S. Appl. No. 15/012,982, U.S. Patent and Trademark Office, filed Dec. 18, 2017.

Cunningham, PTO-892 Notice of References Cited, U.S. Appl. No. 15/012,997, U.S. Patent and Trademark Office, filed Jan. 23, 2018.

Yeung, Notice of References Cited, PTO-892, U.S. Appl. No. 15/012,969, U.S. Patent and Trademark Office, dated Mar. 29, 2018.

* cited by examiner

METHOD AND APPARATUS FOR LOW LATENCY TRANSMISSIONS

CROSS-REFERENCE TO RELATED APPLICATIONS

This application is related to an application entitled "Method and Apparatus for Low Latency Transmissions," U.S. patent application Ser. No. 15/012,969, "Method and Apparatus for Low Latency Transmissions," U.S. patent application Ser. No. 15/012,982, "Method and Apparatus for Low Latency Transmissions," U.S. patent application Ser. No. 15/012,997, and "Method and Apparatus for Low Latency Transmissions," U.S. patent application Ser. No. 15/013,014, all filed on even date herewith and commonly assigned to the assignee of the present application, which are hereby incorporated by reference.

BACKGROUND

1. Field

The present disclosure is directed to a method and apparatus for low latency transmissions. More particularly, the present disclosure is directed to wireless transmissions, signaling, and frame structures for devices configured for low latency data packets while maintaining backward compatibility with devices configured for normal latency data packets.

2. Introduction

Presently, users use wireless communication devices, otherwise known as User Equipment (UE), such as smartphones, cell phones, tablet computers, selective call receivers, and other wireless communication devices, on Long Term Evolution (LTE) networks, Wireless Local Area Networks (WLANs), and other wireless communication networks. Users use the devices to download files, music, e-mail messages, and other data, as well as to watch streaming video, play streaming music, play games, surf the web, and engage in other data intensive activities.

Packet data latency is one of the performance metrics widely used to benchmark system performance. Packet data latency is important not only for the perceived responsiveness of the system; it is also a parameter that indirectly influences the throughput. Certain traffic types are latency sensitive and require reduced latency for their data packets. Such latency sensitive traffic types can include Voice over Internet Protocol, such as for telephone calls, can include gaming, can include automobile control signals, and can include other time sensitive traffic types. HTTP/TCP is the dominating application and transport layer protocol suite used on the internet today with the TCP slow start period is a significant part of the total transport period of the packet stream. During TCP slow start the performance is latency limited. Hence, improved latency can improve the average throughput, for this type of TCP-based data transactions. The latency sensitive traffic types require downlink and uplink packet latency reduction, such as reduction in the time taken for a device in connected mode to transmit and receive data and signals. This is opposed to normal latency packets that are used for traffic types like file downloading and uploading, which are less latency sensitive because the latency minimally affects the file transfers and the normal latency is not readily apparent to a user.

In order to support the latency sensitive traffic types and other latency sensitive new use cases, to expand the application of LTE and other wireless communication systems to a wider set of scenarios, and to enhance LTE with better user perceived experiences there is a need to support lower latency through enhancement of LTE and other wireless communication systems. Unfortunately, present devices do not adequately provide a structure for low latency transmissions. Thus, there is a need for a method and apparatus for low latency transmissions.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Figure 1:
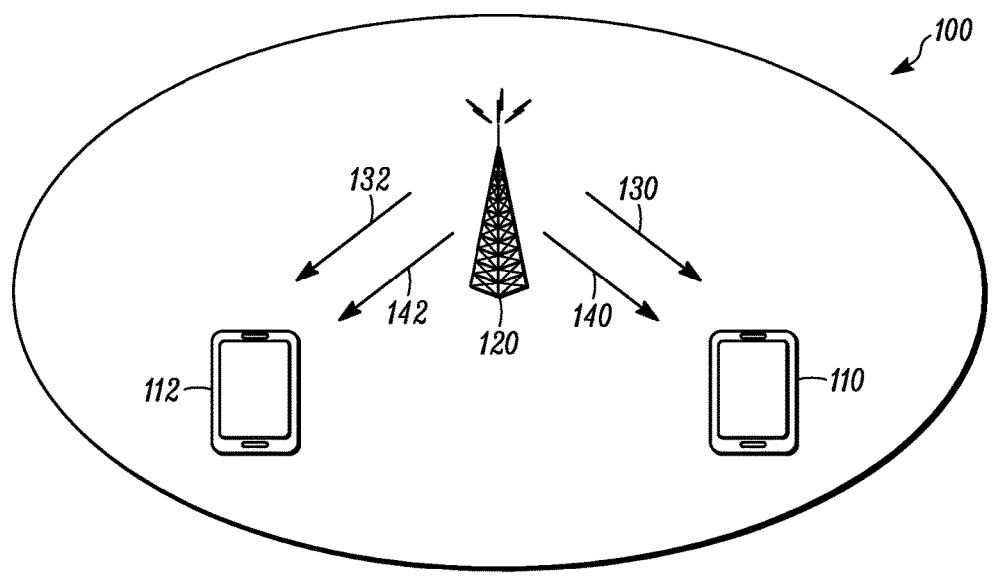
FIG. 1 is an example illustration of a system according to a possible embodiment.

Embodiments can provide for a method and apparatus for low latency transmissions.

According to a possible embodiment, a higher layer configuration message can be received. A first region of a subframe for receiving data packets can be determined based on the higher layer configuration message. The first region can include a first set of resource elements. The first set of resource elements can be a subset of a second set of resource elements in the first region. The first region can be used for control channel monitoring. The data packets can be mapped to at least one resource element of the first set of resource elements. The first region can be monitored by attempting to decode the data packets in the first region. Data in the data packet in the first region can be decoded.

According to another possible embodiment, a higher layer configuration message can be received that indicates a set of resource blocks for receiving data packets in at least one symbol of a subframe. In another embodiment, the higher layer configuration message can indicate which time frequency resources are likely candidates for the transmission of low latency related transmissions. The low latency related transmissions can include, low latency data, low latency decoding assistance information, and other low latency transmissions. An attempt can be made to decode a data packet in a first set of resource elements within the set of resource blocks. The first set of resource elements can be in the at least one symbol of the subframe. An attempt can be made to decode the data packet in at least a second set of resource elements within the set of resource blocks. The second set of resource elements can be in the at least one symbol of the subframe. The second set of resource elements can include at least one resource element that is not in the first set of resource elements. The data packet in one of the first set of resource elements and the second set of resource elements can be successfully decoded. A data payload of the decoded data packet can be delivered to an application layer.

According to another possible embodiment, a higher layer configuration can be received at a device. The higher layer configuration can be higher than a physical layer configuration. The higher layer configuration can indicate configuring the device with a low latency configuration for a low latency transmission mode in addition to a regular latency configuration for a regular latency transmission mode. The low latency transmission mode can have a shorter latency than the regular latency transmission mode. A packet can be received based on one of the low latency configuration and the regular latency transmission mode in a subframe n. A feedback packet can be transmitted in a following subframe n+p, where p<4 when the received packet is based on the low latency configuration, where the following subframe n+p can be the $p^{th}$ subframe from the subframe n. A feedback packet can be transmitted in a following subframe n+4 when the received packet is based on the regular latency configuration, where the following subframe n+4 can be the fourth subframe from the subframe n.

According to another possible embodiment, a resource assignment can be transmitted. The resource assignment can assign a first set of time-frequency resources in a subframe for regular latency data transmission. Low latency data can be transmitted within a second set of time-frequency resources in the subframe. The second set can at least partially overlap with the first set. The low latency data can have a lower latency than regular latency data. A marker signal can be transmitted. The marker signal can indicate a presence of low latency data transmission in the subframe.

According to another possible embodiment, a resource assignment can be received. A first set of time-frequency resources in a subframe can be determined from the resource assignment. A second set of time-frequency resources in the subframe can be determined. The second set of time-frequency resources can be for a low latency data transmission. The second set of time-frequency resources can overlap with at least a portion of the first set of time-frequency resources. A regular latency data transmission in the subframe can be decoded based on the determined first and second set of time-frequency resources. The regular latency transmission can have a longer latency than the low latency transmission.

According to another possible embodiment, a first control channel can be transmitted in a first temporal portion of a subframe. The subframe can include a plurality of Orthogonal Frequency Division Multiplexing (OFDM) symbols in a time domain and a plurality of subcarriers in a frequency domain. The first control channel can occupy a first portion of subcarriers less than the plurality of subcarriers. The first control channel can assign first data resources only in the first temporal portion of the subframe. A second control channel can be transmitted in a second temporal portion of a subframe. The first temporal portion can occupy at least one different first OFDM symbol in the subframe from the second temporal portion. The second temporal portion can occupy at least one different second OFDM symbol in the subframe from the first temporal portion. The second control channel can occupy a second portion of subcarriers that is less than the plurality of subcarriers. The second control channel can assign second data resources only in the second temporal portion of the subframe.

According to another possible embodiment, a first control channel can be monitored in a first temporal portion of a subframe. The subframe can include a plurality of Orthogonal Frequency Division Multiplexing (OFDM) symbols in a time domain and a plurality of subcarriers in a frequency domain. The first control channel can occupy a first portion of subcarriers less than the plurality of subcarriers. The first control channel can assign data resources only in the first temporal portion of the subframe. A second control channel can be monitored in a second temporal portion of a subframe. The first temporal portion can occupy at least one different OFDM symbol in the subframe from the second temporal portion. The second temporal portion can occupy at least one different OFDM symbol in the subframe from the first temporal portion. The second control channel can occupy a second portion of subcarriers less than the plurality of subcarriers. The second control channel can assign data resources only in the second temporal portion of the subframe. The first control channel can be decoded. In response to decoding the first control channel, data can be received in the first temporal portion of the subframe. The data in the first temporal portion can be assigned by the first control channel. The data can be decoded.

According to some embodiments, in order to support new use cases and expand the application of Long Term Evolution (LTE) and other wireless communications to a wider set of scenarios, and to enhance LTE with better user perceived experiences there is a need to support lower latency through enhancement of LTE. Embodiments can provide a new frame structure and other features to support devices needing lower latency while at the same time supporting devices with regular latency.

FIG. 1 is an example illustration of a system 100 according to a possible embodiment. The system 100 can include a first device 110 and a second device 120. While the first device 110 is illustrated as a User Equipment (UE) and the second device 120 is illustrated as a base station, such as an Enhanced Node-B (eNB), the roles may also be reversed. Furthermore, the devices 110 and 120 can be the same type of device, such as UE's or base stations, and can be any other type of device that can send and receive wireless communication signals. For illustrative purposes in some embodiments, the first device 110 may be referred to as a UE and the second device 120 may be referred to as a base station, but it is understood that the first device and the second device 120 can be any transmitting and/or receiving devices in all of the embodiments. The first device 110 and the second device 120 can communicate on different cells 130 and 140. The system 100 can also include another device 112 that can communicate with the second device 120 on different cells 132 and 142 in a similar manner to the first device 110. The devices 110 and 112 can be any devices that can access a wireless network. For example, the devices 110 and 112 can be UE's, such as wireless terminals, portable wireless communication devices, stationary wireless communication devices, smartphones, cellular telephones, flip phones, personal digital assistants, personal computers having cellular network access cards, selective call receivers, tablet computers, or any other devices that are capable of operating on a wireless network.

The communication system 100 can utilize Orthogonal Frequency Division Multiple Access (OFDMA) or a next generation single-carrier based FDMA architecture for uplink transmissions, such as interleaved FDMA (IFDMA), Localized FDMA (LFDMA), Discrete Fourier Transform-spread OFDM (DFT-SOFDM) with IFDMA or LFDMA. In other embodiments, the architecture may also include the use of spreading techniques such as direct-sequence CDMA (DS-CDMA), multi-carrier CDMA (MC-CDMA), multi-carrier direct sequence CDMA (MC-DS-CDMA), Orthogonal Frequency and Code Division Multiplexing (OFCDM) with one or two dimensional spreading, or simpler time and frequency division multiplexing/multiple access techniques. In another implementation, the wireless communication system is compliant with the 3GPP Universal Mobile Telecommunications System (UMTS) LTE protocol, also referred to as EUTRA or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. In yet another implementation, the wireless communication system is compliant with the 3GPP Universal Mobile Telecommunications System (UMTS) LTE-Advanced protocol, also referred to as LTE-A or some later generation or release of LTE thereof, wherein the base unit can transmit using an orthogonal frequency division multiplexing (OFDM) modulation scheme on a single or a plurality of downlink component carriers and the user terminals can transmit on the uplink using a single or plurality of uplink component carriers. More generally the wireless communication system may implement some other open or proprietary communication protocol, for example, WiMAX, among other existing and future protocols. The architecture in which the features of the embodiments are implemented may also be based on simpler time and/or frequency division and/or space division multiplexing/multiple access techniques, or a combination of these various techniques. In alternate embodiments, the wireless communication system may utilize other communication system protocols including, but not limited to, Time Division Multiple Access (TDMA) or direct sequence Code Division Multiple Access (CDMA). The communication system may be a Time Division Duplex (TDD) or Frequency Division Duplex (FDD) system.

In OFDM systems or OFDM like systems such as DFT-SOFDM and IFDMA, a resource allocation is a frequency and time allocation that maps information for a particular communication device or remote unit to sub-carrier resources from a set of available sub-carriers as determined by a scheduler. This allocation may depend, for example, on the frequency-selective Channel-Quality Indication (CQI) or some other metric reported by a remote unit, such as a user equipment, to the scheduler. The channel-coding rate and the modulation scheme, which may be different for different portions of the sub-carrier resources, are also determined by the scheduler and may also depend on the reported CQI or other metric. In code division multiplexed networks, the resource allocation is code allocation that maps information for a particular communication device or remote unit to channelization code resources from a set of available channelization codes as determined by the scheduler.

In LTE, the radio frame can generally comprise a plurality of subframes, which may form a concatenated continuum of subframes. An example radio frame contains 10 subframes. Each subframe can correspond to a Transmission Time Interval (TTI). An example TTI is 1 ms. Each subframe can be composed of two slots each having a 0.5 ms length with each slot containing for example, 7 OFDM symbols given a normal cyclic prefix length and only 6 OFDM symbols if an extended cyclic prefix length is used. Each subframe can be composed of a control region and a data region. The control region may be in time-domain comprising one or more OFDM symbols, or in frequency domain comprising one or more resource blocks. In communication systems, assigned channels can be employed for sending data and also for control signaling or messaging of the system. Control signals or messages may be transmitted in Control CHannels (CCHs) and are used for both the forward link transmissions, also known as the downlink transmission, from a network or base station to user equipment or device, and reverse link transmission, also known as uplink transmissions, from the user equipment or device to the network or base station. In systems, such as LTE of UTRA, where the downlink control channel is composed of a single decodable element called a Control Channel Element (CCE), or an aggregation of decodable elements called Control Channel Elements (CCEs), a user equipment can identify from a large group of CCEs the subset of CCEs intended for the particular user equipment. In one embodiment the user equipment can be configured to attempt to decode low latency packets or messages transmitted in the control region. The user equipment can be configured to monitor low latency packets in a subset of the CCEs, denoted as Low Latency CCEs (LL-CCEs) intended for possible low latency data transmissions to the user equipment. The subset of CCEs intended for a particular user equipment to monitor or attempt to decode at a particular CCE aggregation level, L, (e.g., L=1, 2, 4 or 8 CCEs) is called the set of resources for that user equipment at the particular CCE aggregation level, L. The set of resources for a user equipment can contain one or more resource subsets where each resource subset can include one or more CCEs corresponding to the aggregation level and the resource subset can correspond to a candidate downlink control channel also called a physical downlink control channel (PDCCH) candidate. The set of resource subsets at a particular CCE aggregation level, L, can correspond to the set of PDCCH candidates at the aggregation level L that the particular user equipment monitors in the search space corresponding to set of resources at the particular CCE aggregation level, L. The control region size can be, for example, 1, 2, or 3 OFDM symbols and may depend on a number of symbols signaled for a subframe in a higher layer configuration message or may depend on the number of symbols signaled by a Physical Control Format Indicator Channel (PCFICH) which can be transmitted in symbol 0 of each subframe control region and can be composed of four Resource Element Groups (REGs) distributed across frequency. Each REG can be composed of 4 contiguous or nearly contiguous control resource elements and may also include up to 2 reference signals if the associated antenna ports are configured. Each CCE can include 9 REGs which can be pseudo-randomly distributed or interleaved across frequency and the OFDM control symbols in the control region based on a subblock interleaver. The CCEs and corresponding REGs available to use for low latency data transmissions, may be the remaining CCEs in the control region after accounting for PCFICH and the Physical Hybrid Automatic Repeat ReQuest (ARQ) Indicator CHannel (PHICH), and control channel CCEs. A Physical Downlink Control CHannel (PDCCH) can include for example 1, 2, 4, or 8 CCEs depending on the CCE aggregation level, L. A PDCCH can be associated with a DCI format type. The PDCCH conveys Downlink Control Information (DCI) of a given DCI format type that contains the data assignments. Two or more DCI format types may have the same DCI format size or may have different DCI format sizes. The number of DCI format types assigned to a user equipment to monitor can be dependent on the transmission mode, such as downlink MIMO or downlink single antenna, assigned to the user equipment via higher layer signaling such as Radio Resource Control (RRC) signaling. In the case where more than 1 CCE is aggregated to form the PDCCH, the CCEs can be in logically contiguous in terms of the location in the PDCCH candidate search spaces. The PDCCH candidate locations may be the same for one or more DCI format types. The data region can contain data symbols, such as QAM symbols with one data symbol per Resource Element (RE). Twelve consecutive resource elements for a duration of a slot can be grouped to form resource blocks (RBs). A resource block can span a slot or 7 OFDM symbols for a normal cyclic prefix length such that two RBs (or a single RB pair) span the subframe. The number of data OFDM symbols in the first RB corresponding to the first slot of a subframe can be shortened by the number of OFDM control symbols allocated. In one embodiment, the user equipment can attempt to decode control channel and low latency data transmissions in the control region. The user equipment can identify a control channel based on a first RNTI (e.g., C-RNTI) and low latency data packets based on a second RNTI (e.g., LL-RNTI). The set of aggregation levels for low latency data packets candidates may be the same, a subset, or different than the set of aggregation levels for PDCCH candidate the UE monitors. In some embodiments, for a particular aggregation level, the search space for the low latency data packets may be the same as the search space for PDCCH. In other embodiments, for a particular aggregation level, the search space for the low latency data packets may be a subset or different (e.g., non-overlapping, partially overlapping) than the search space for PDCCH. In some embodiments, for a particular aggregation level, the search space for the low latency data packets may be an offset from the search space for PDCCH. The offset may be based on the number of PDCCH candidates at that particular aggregation level and the value of the particular aggregation level. Such an approach can prevent blocking when multiple uplink and/or multiple downlink scheduling grants or assignments occur in the control region of a subframe. In some embodiments, one or more of the possible low latency data payload sizes associated with the monitored low latency data packets candidates may be the same, a subset, or different than the DCI format sizes associated with the monitored PDCCH candidates. In one embodiment, the user equipment may for a particular aggregation level and candidate, first attempt to decode the control channel candidate using its C-RNTI and failing this, it can attempt to decode using the LL-RNTI. Alternately, it can attempt to decode the candidate using different Downlink Control Information (DCI) format types with possibly different DCI format sizes. In one further embodiment, a new DCI format type can be defined for low latency transmissions or packets. The new DCI format type for low latency data packets may have a different DCI format size than the DCI format size of PDCCH for regular latency data packets. The DCI format type may also be referred to as control channel message type.

In one embodiment, some of the REs in the data region can be set aside for supporting low latency transmissions. In one embodiment, the REs can be used for low latency data packet transmission. In other embodiments the REs may also be used for marker information transmission to assist user equipments receiving regular latency transmissions in decoding regular latency packet transmissions and/or low latency packet transmissions.

In some embodiments, a user equipment may monitor low latency control channel (e.g., LL-PDCCH) candidates with a DCI that contains the resource assignment for a low latency data packet. The low latency data packet may be transmitted in a data region from one or more data regions in a subframe. In an embodiment, the low latency data packet can be transmitted in a data region associated with or based on the location of the control channel that contains the resource assignment for the low latency data packet. The relationship between the location of the low latency data packet and the control channel containing the low latency data resource assignment may be predetermined (e.g, each subframe region can include a control channel and low latency data region, the resource elements or resource element groups of the control channel and low latency data region may be interleaved within the subframe region), or determined by higher layer signaling (e.g., signaling of one or more configuration parameters, such as gap or offset, OFDM symbols, resource block indices etc.). In another embodiment, the location of the low latency data packet can be included in the DCI resource assignment message of the control channel corresponding to the low latency data packet for the user equipment. A particular user equipment can locate the low latency control channel elements corresponding to each LL-PDCCH candidate it is to monitor (blindly decode). The CRC of each LL-PDCCH can be masked by a unique identifier corresponding to the user equipment that the base station is trying to schedule. The unique identifier can be assigned to the UE by its serving base station. This identifier can be known as a radio network temporary identifier (RNTI) and the one normally assigned to each UE at call admission can be the cell RNTI or C-RNTI. A UE may also be assigned a Semi-Persistent-Scheduling C-RNTI (SPS C-RNTI) or a temporary C-RNTI (TC-RNTI) or a low latency RNTI (LL-RNTI). When a UE configured to receive low latency transmission decodes a LL-PDCCH it may, in addition to the C-RNTI (e.g., in case the LL-PDCCH can also be used for regular latency data packet assignment, with same DCI format size), also apply its LL-RNTI in the form of a mask to the PDCCH CRC for successful LL-PDCCH decoding to occur in case low latency transmission control channel has been transmitted to the user equipment. When a user equipment successfully decodes a LL-PDCCH of a particular DCI format type with CRC masked with LL-RNTI, it can use the control information from the decoded LL-PDCCH to determine, for example, the resource allocation, Hybrid ARQ information, and power control information for the corresponding low latency data.

In LTE, DCI format type 0, 4 is used for scheduling uplink data transmissions on the Physical Uplink Shared CHannel (PUSCH) and DCI format type 1A is used for scheduling downlink data transmissions on the Physical Downlink Shared CHannel (PDSCH). Other DCI format types are also used for scheduling PDSCH transmissions including DCI format 1, 1B, 1D, 2, 2A, 2B, 2C, 2D, each corresponding to a different transmission mode (e.g. single antenna transmissions, single user open loop MIMO, multi-user MIMO, single user close loop MIMO, rank-1 precoding, dual layer transmission scheme, up to 8 layer transmission scheme). Also there are DCI format 3 and 3A for scheduling the transmission of joint power control information. PDCCH DCI format 0, 1A, 3, and 3A all have the same size payload and hence the same coding rate. So only one blind decoding is required for all of 0, 1A, 3, 3A per PDCCH candidate. The CRC is then masked with C-RNTI to determine if the PDCCH was DCI format type 0 or 1A and a different RNTI if it is 3 or 3A. DCI format type 0 and 1A are distinguished by DCI type bit in the PDCCH payload itself (i.e. part of the control information on one of the control information fields). A UE may always be required to search for all of DCI formats 0, 1A at each PDCCH candidate location in the UE specific search spaces. There are four UE specific search spaces for aggregation levels 1, 2, 4, and 8. Only one of the DCI format types 1, 1B, 1D, 2, 2A, 2B, 2C, or 2D is assigned at a time to a UE such that a UE only needs to do one additional blind decoding per PDCCH candidate location in the UE specific search space besides the blind decoding needed for the DCI format types 0, 1A and possibly DCI format type 4. The PDCCH candidate locations are the same for the DCI format types when they are located in the UE specific search spaces. There are also two 16 CCE common search spaces of aggregation level 4 and 8 respectively that are logically and sometimes physically (when there are 32 or more control channel elements) adjacent to the UE specific search spaces. In the common search spaces, a UE monitors DCI types 0, 1A, 3, and 3A as well as DCI format type 1C. DCI format type 1C is used for scheduling broadcast control which includes paging, random access response, and system information block transmissions. DCI 1A may also be used for broadcast control in the common search spaces. DCI 0 and 1A are also used for scheduling PUSCH and PDSCH in common search spaces. A UE is required to perform up to 4 blind decodings in the L=4 common search space and 2 blind decodings in the L=8 common search space for DCI formats 0, 1A, 3, and 3A and the same number again for DCI 1C since DCI 1C is not the same size as DCI 0, 1A, 3 and 3A.

A UE is required to perform (6, 6, 2, 2) blind decodings for L=(1, 2, 4, 8) UE specific search spaces respectively where L refers to the aggregation level of the search space. The total maximum number of blind decoding attempts a UE is then require to perform per subframe control region is therefore 44 (=2×(6,6,2,2)+2×(4,2)) for two DCI format sizes in the UE specific search space and two DCI format sizes in the common search space. A hashing function is used by the base station and the UE to find the PDCCH candidate locations in each search space. The hashing function is based on the UE RNTI (identifier associated with the UE. e.g., C-RNTI, or Temporary C-RNTI), aggregation level (L), the total number of CCEs available in the control region (Ncce), the subframe number or index, and the maximum number of PDCCH candidates for the search space. Such an approach prevents blocking when multiple control channels and/or low latency data packets occur in the same region of a subframe.

In one embodiment, a method in a base station can indicate the low latency message resource subset corresponding to the low latency message, which can be selected by the base station from one of the one or more candidate resource subsets in a search space within a control or data region based on at least a low latency message type (e.g., LL xyz format type) of the low latency message to a UE. The low latency message type may correspond to an identifier other than a PDCCH DCI format type. The UE can determine which set of resources in a search space to use for blind decoding attempts at least partially based upon one or more of a location offset (in terms of number of CCEs or aggregated CCEs or in terms of number of candidates at the aggregation level) associated with or determined by a low latency message type of the low latency message the UE is to search and an identifier associated with the UE. Each set of resources located in a search space therefore can include candidate resource subsets of a particular message type with a location offset relative to a set of resources with zero offset or relative to the location of a reference set of resources. Low latency message information for the UE can be transmitted by the base station via the selected resource elements subsets using the selected resource subset from the set of resources associated with the low latency message type. The UE can use blind decoding attempts to determine which resource subset was used from the set of resources in a search space for communicating the low latency message.

In one embodiment, a particular user equipment may locate the resource elements corresponding to each low latency data channel candidate it is to monitor (blindly decode for each subframe control region). The CRC of each low latency data channel may be typically masked by a unique identifier corresponding to the user equipment that the base unit is trying to schedule. In other embodiments the CRC may be masked with a common identifier for all low latency data packets or low latency data packet receiving user equipments. The unique identifier can be assigned to the UE by its serving base station. In one embodiment, this identifier can be known as a Radio Network Temporary Identifier (RNTI) and the one normally assigned to each UE at call admission can be the Low Latency RNTI or LL-RNTI. A UE may also be assigned a semi-persistent-scheduling C-RNTI (SPS C-RNTI) or a temporary C-RNTI (TC-RNTI) and a cell specific C-RNTI. When a UE decodes resource elements corresponding to a low latency data packet, it can apply its LL-RNTI in the form of a mask to the low latency data packet CRC for successful decoding to occur. When a UE successfully decodes a low latency data packet meant for it, it can then send it to the application layer for use by the appropriate service needing low latency transmission. The UE may need to attempt to descramble the decoded packet in order to determine that the packet is meant for it. In one embodiment, all UE's can be capable of decoding the low latency packets but may not be able to read the contents of the packets if they fail to descramble the decoded packet successfully. The scrambling process by the base station prior to transmission allows the base station to maintain user privacy while permitting every user equipment to decode the packet.

Channel coding (e.g., convolutional coding) blind detection can be used to distinguish between PDCCH DCI formats with different sizes. For DCI formats of the same size, different masking of the scrambled CRC can be used or instead an extra bit in the PDCCH payload itself can be used to distinguish between same size PDCCH DCI formats (e.g. DCI format 0 and 1A). An example includes, but is not limited to, the case of broadcast control which uses SI-RNTI, P-RNTI, or RA-RNTI for DCI format 1A instead of C-RNTI.

In one embodiment, the UE search space may support 4 aggregation levels including (1, 2, 4, or 8) logically contiguous CCEs per PDCCH (candidate) hypothesis and low latency data candidates with (6,6,2,2) blind detection locations, for each of the aggregation levels respectively.

In one method of determining the CCE locations $S_k^{(L)}$ corresponding to a PDCCH or low latency data candidate m of each aggregation level L (e.g., L=(1, 2, 4, or 8)) search space for subframe 'k' of a radio frame is given by equation:

$$S_k^{(L)} = L\{(Y_k + m') \bmod (\lfloor N_{CCE,k}/L \rfloor)\} + i \quad (1)$$

where $Y_k = 39827 \cdot Y_{k-1} \bmod 65537$ where $Y_{-1} = n\_RNTI$ for the UE specific search space; $n\_RNTI \neq 0$ is either C-RNTI or temporary C-RNTI or LL-RNTI; $N_{CCE,k}$ is the number of total CCEs available for subframe k; m'=m for PDCCH candidates; and $m'=m+\Delta(M^{(L)})$ for low latency data candidates, where $\Delta$ is an offset based on the number of PDCCH candidates to monitor in the search space at aggregation level L ($M^{(L)}$). For example, $\Delta = \alpha M^{(L)}$, where $\alpha$ can take on values such as ⅓, ½, 1, m=0, . . . , $M^{(L)}$−1, where $M^{(L)}$=(6,6,2,2) for L=(1,2,4,8), and i=0, . . . , L−1 where i spans each consecutive CCE of the PDCCH or low latency data hypothesis.

Equation (1) can randomize the candidate hypothesis CCE locations per aggregation level search space to minimize blocking. A UE can performs a convolutional coding blind detection (CCBD) for DCI format types for PDCCH and low latency data at the corresponding aggregation level for the candidate hypothesis. The blind decoding can allow the base station to dynamically select the aggregation size based on for example the channel conditions such that a large number of CCEs need not be used all of the time.

Figure 2:
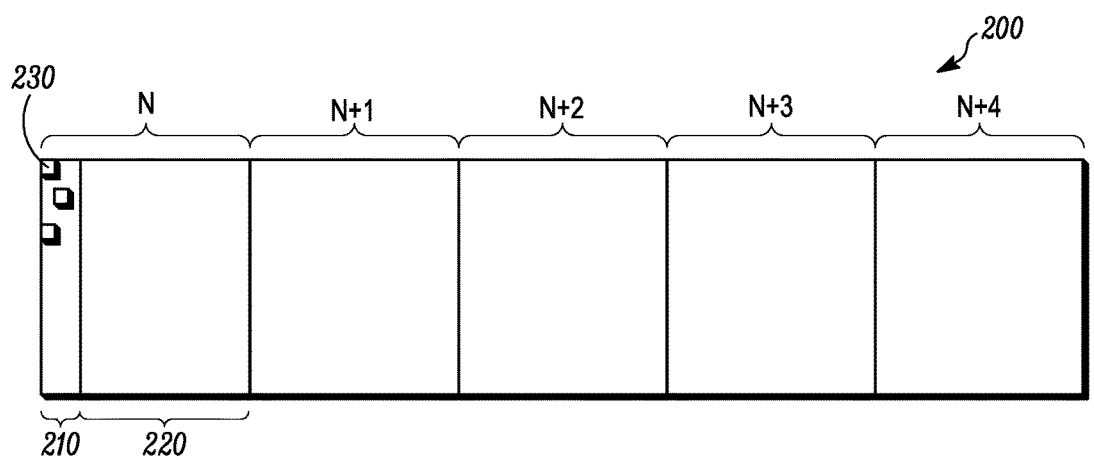
FIG. 2 is an example illustration of subframes according to a possible embodiment.

FIG. 2 is an example illustration 200 of subframes n through n+4 according to a possible embodiment. The subframe n can include a first region 210, such as a control region, and a second region 220, such as a data region. The first region 210 can include resource elements 230. In some embodiments, a resource element (RE) can represent a single subcarrier for a single OFDM symbol period in the subframe. More generally, a resource element can be a smallest identifiable time/frequency/code/spatial domain resource unit within the subframe. Data packets, such as low latency data packets or other data packets, can be mapped to at least one resource element of the resource elements 230. If a data packet is received in the first region 210, an acknowledgement, such as a HARQ ACK, can be sent in a subsequent subframe, such as a subframe earlier than subframe n+4, that is subsequent to the subframe n in which the data packet is received.

According to this possible embodiment, a device can receive a higher layer configuration message, where the higher layer can be higher than a physical layer. The higher layer message can be a dedicated mode RRC (Radio Resource Control) message sent to the device. In some embodiments it can be sent through broadcast system information message to all devices in a cell. The device can determine, based on the higher layer configuration message, a first region of a subframe for receiving data packets. In one embodiment the first region in the subframe can correspond to a set of time-domain resources in the subframe, such as OFDM symbols durations. In another embodiment the first region of the subframe can correspond to a set of frequency-domain resources in the subframe such as Resource Blocks (RBs) where each resource block can comprise a set of OFDM sub-carriers. In another embodiment the first region of the subframe can correspond to a set of Resource Elements (REs). In yet another embodiment the first region of the subframe can correspond to a set of Control Channel Elements (CCEs), where each control channel element can correspond to a set of resource elements or set of Resource Element Groups (REGs) within the subframe. The first region can include a first set of REs, where the first set of REs can be a subset of a second set of REs in the first region. In some embodiments, the second set of resource elements can correspond to all the resource elements in the first region of the subframe on which the device can expect to receive control channels. The control channels can be channels such a Physical Downlink Control Channel (PDCCH) or Enhanced Physical Downlink Control Channel (EPDCCH). In some other embodiments, the second set of resource elements can correspond to all the resource elements in the first region of the subframe on which the device can expect to receive control channels and acknowledgement signalling. The control channels can be channels such as PDCCH and EPDCCH. The acknowledgement signalling can be channels, such as Physical Hybrid-ARQ Indicator Channel (PHICH). In some other embodiments, the second set of resource elements can correspond to all the resource elements in the first region of the subframe. The first region can be used for control channel monitoring. Data packets can be mapped to (or transmitted on) at least one RE of the first set of REs. The device can monitor the first region, where monitoring can include attempting to decode the data packets in the first region. Attempting to decode can include blind decoding by the device. The device can decode data in the data packet in the first region. In one embodiment, the device can monitor the first set of REs in the first region, where monitoring can include attempting to decode the data packets in the first set of REs first region. Attempting to decode can include blind decoding by the device. The device can decode at least one data packet in at least some REs of the first set of REs in the first region.

In some embodiments, the higher layer message can include a list of possible candidate resource elements or REGs, also used as control channel elements, that the device can attempt to receive low latency data on. The base station can set aside a set of REGs for low latency transmission but these REGs can be available to be reused for PDCCH transmission in case there is no low latency data to be transmitted or if other scheduling priorities do not permit transmission of low latency data in that subframe.

In some embodiments the device can monitor the second set of REs in the first region of the subframe for control channel signalling and also monitor the first set of REs, which can be a subset of the second set of REs, for low latency data packet transmissions. Both the first and second set of REs can belong to the first region of the subframe. The first region can be a control region of the subframe. As a result of the monitoring, if the device decodes control signalling in the first region of the subframe, the device can use the downlink control information (DCI) to determine PDSCH resource assignments. The PDSCH resource assignments can be used by the device to receive payload of data packets (e.g. regular latency data packets), which can then be delivered to higher layers such as an application layer. As a result of the monitoring, if the device decodes payload of low latency data packets in the first region of the subframe, the device can deliver the low latency data packets to higher layers such as an application layer. Low latency data packets can have more stringent packets delivery delay requirements than regular latency data packets.

According to a related implementation, the device can be configured via higher layer signalling to monitor for low latency (LL) data packets with a low latency Downlink Control Information (DCI) format (e.g. a DCI Format LL1). The low latency DCI format can also be alternatively referred to as Low latency Data Information format (LDI format). The device may also be configured with higher layers with transmission mode and, based on the transmission mode, the device may monitor control signalling that assigns PDSCH data assignments using transmission of one or more DCI formats (e.g. DCI format 1A, 1, 2, 2A, 2B, 2C). The device may monitor for low latency data packets with the low latency DCI format in the control region of the subframe. Up to three or more OFDM symbols can be used for the control region. Alternately, up to 8 or more RBs in the subframe can be used for control region.

Figure 19:
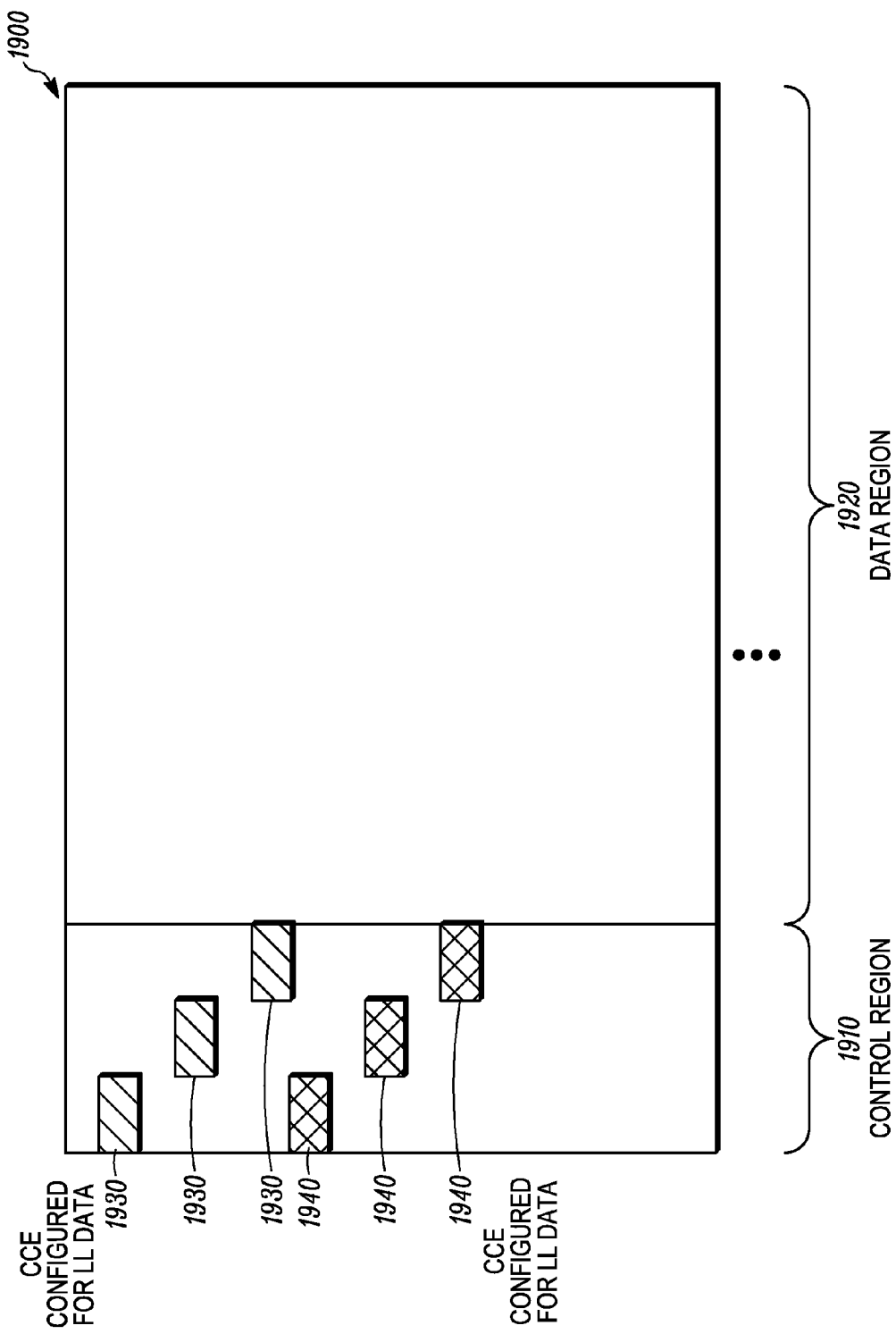
FIG. 19 is an example illustration of a subframe according to a possible embodiment.

FIG. 19 is an example illustration of a subframe 1900 according to a possible implementation of this embodiment. The subframe 1900 can include a first region 1910, such as a control region, and a second region 1920, such as a data region. The first set of REs used for LL data monitoring can be further organized into multiple control channel elements (CCEs) 1930 and 1940 where each CCE 1930 and 1940 can include multiple resource elements. The device may monitor the same control channel elements (CCEs) in the control region for both low latency data and for control signalling that assigns PDSCH data assignments. More generally, the device may monitor a first set of CCEs created by organizing the first set of REs for low latency data assuming a first DCI format (e.g. DCI format LL1) and first set of CCE aggregation levels, and a second set of CCEs created by organizing the second set of REs for control channels that assign PDCCH data assignments assuming a second DCI format (e.g. DCI Format 1A, 1, 2, 2A, 2B, 2C) and a second set of CCE aggregation levels. Monitoring can be attempting to decode either low latency data or control channels according to the assumed DCI format(s) and aggregation level(s). 'Monitoring' or 'attempting to decode' can also be blind decoding. The first set of CCEs can be a subset of the second set of CCEs. Alternately, the first set of CCEs can be same as second set of CCEs. Having the first set as a subset of the second set can reduce the blind decoding complexity for the device. Similarly, the first set of CCE aggregation levels can be same as second set of CCE aggregation levels or the first set of CCE aggregation levels can be a subset of second set of CCE aggregation levels, such as aggregation levels L=2, 4,8 for monitoring LL data transmissions and L=1, 2, 4, 8 for monitoring control channels. Having fewer aggregation levels for monitoring LL data packets can also reduce UE blind decoding complexity. The CCE size used for monitoring LL data packets can be different from the CCE size used for monitoring control channels. For example, for monitoring LL data, a CCE size of 72 REs (or 18 REGs where each REG has 4 data REs) can be used while, for monitoring control channels, a CCE size of 36 REs (or 9 REGs where each REG has 4 data REs) can be used. The DCI format size(s) of the low latency DCI format(s) can be same as one of the DCI format sizes used for control channel monitoring. For example, DCI format LL1 can be same size as DCI Format 1A, and DCI Format LL2 can be same size as one of the transmission mode specific DCI formats. For example, if the device is configured with transmission mode 2, DCI Format LL2 will have same size as DCI Format 1, if the device is configured with transmission mode 10, DCI Format LL2 will have same size as DCI Format 2D. Transmission of data in the control region is especially suitable for small data packet sizes, such as 8-500 bits.

In some implementations, the LL data information (LDI or LL DCI) monitored in the first region can be distinguished from the DCI of the control channels monitored in the same region based on Cyclic Redundancy Check (CRC) masking with different CRC masks. This is especially suitable when the DCI format size(s) of the low latency DCI format(s) are same as one of the DCI format sizes used for control channel monitoring. During blind decoding (or monitoring) of control channels for DCI that contains PDSCH data assignments, the device may assume that the CRC of the DCI is encoded or scrambled with a device specific identifier, for example a Cell-Radio Network Temporary Identifier (C-RNTI); or a common identifier, for example a Paging-Radio Network Temporary Identifier (P-RNTI). During blind decoding (or monitoring) of LL data packets, the device may assume that the CRC of the payload of the LL data packet is encoded with a special identifier associated with LL data monitoring, for example a Low Latency-Radio Network Temporary Identifier (LL-RNTI). The special identifier can be indicated to the device via higher layer (e.g, RRC) messages. More generally, the device can perform control channel monitoring in a first region of a subframe, the device can determine successful decoding of a control channel (e.g. PDCCH) or the DCI associated with the control channel using a first identifier (e.g. using a cyclic redundancy check (CRC), assuming that the CRC of the DCI is encoded using C-RNTI), and the device can determine successful decoding of data payload of a data packet (e.g. a LL data packet) in the first region using a second identifier (e.g. using a cyclic redundancy check (CRC), assuming that the CRC of the data payload is encoded using LL-RNTI)

The CCEs or groups of REs from the second set of REs monitored by the device for control signalling can be associated with control channels such as PDCCH or EPD-CCH. In some implementations, the CCEs or groups of REs in the first set monitored by the device for LL data can be associated with a separate physical channel using which low latency data is received (e.g. LL-PDSCH). In some cases, groups of REs in the first set monitored by the device for LL data can be referred by a name other than 'CCEs' such as Low latency Channel Elements (LCEs). In some implementations, the CCEs monitored by the device for LL Data can still be associated with a control channel such as PDCCH or EPDCCH, but the information decoded on the CCEs, i.e., the DCI or LDI, is associated with a data channel such as PDSCH.

In some implementations, feedback (e.g. ACK or NACK) in response to decoding LL data can be sent in a subframe earlier than subframe n+4, such as subframe n+2, in response to LL data packets decoded in the first region of a subframe n. In this implementation, a device may be configured via higher layers with a low-latency transmission mode or a low-latency feature. The first region can be a control region corresponding to the first 1-3 OFDM symbols of a 1 ms TTI. Since the region is in the beginning portion of the subframe, the LL data sent there can be decoded much earlier. For example, the decoding can start when the device receives 3 OFDM symbols (if the LL data is sent in control region) rather than after device receives all 14 OFDM symbols (if the LL data were to be sent in regular manner, such as using PDSCH RBs that span till the end of the subframe that are assigned via DCI in PDCCH/EPDCCH) of a 1 ms TTI. Due to this early decoding benefit, the device can then transmit the feedback earlier, such as in subframe n+2, or in latter half of subframe n+1. If the payload for LL data is small, such as around 100 bits or so the control channel decoder implemented in devices can also take advantage of the smaller payload to complete the decoding early.

According to a possible implementation, a first region, such as a control channel region of a LTE subframe, can be used to define a new resource allocation design in support of low latency packet transmission and can be used for a control channel for normal or regular latency packet transmission. The device can be configured with a first set of RE's within the control channel region and the device can then blindly decode data packets using this first set of RE's. Downlink latency can be reduced in multiple ways in conjunction with a legacy frame structure, such as the LTE Rel-8 frame structure, where a legacy Transmission Time Interval (TTI) can have a 1 ms duration, the legacy subframe can be 1 ms, and a legacy slot can be 0.5 ms. The system 100 can be simultaneously run with at least two different TTI durations, a legacy 1 ms TTI duration and at least one new TTI duration, such as 0.5 ms. Embodiments can provide faster processing time and faster Hybrid Automatic Repeat Request (HARQ) feedback transmission, such as where a HARQ Acknowledgement (HARQ-ACK) can be sent faster than 4 TTI's later, such as earlier than subframe n+4 after subframe n. For example, an ACK/NACK can be sent in subframe n+2, instead of n+4. Embodiments can also provide for faster Channel Quality Indicator (CQI) transmission, reduced TTI duration for packet transmission, such as using 0.5 ms TTI, and reduced TTI duration for feedback transmission, such as using 0.5 ms TTI. For Time Division Duplex (TDD), for a Physical Downlink Shared Channel (PDSCH) in subframe n, an uplink ACK/NACK resource can be assigned in each n+2 or n+4 timing.

In LTE, in the downlink, a UE may be configured with a transmission mode from a plurality of transmission modes for PDSCH reception, such as transmission mode 1-10 in Rel-12 LTE. A transmission mode can be associated with one or more PDSCH transmission scheme. A PDSCH transmission scheme may be, for example, a single antenna port transmission, transmit diversity, closed loop spatial multiplexing, open loop spatial multiplexing, large delay cyclic delay diversity, dual or a plurality of antenna ports transmission schemes. Some transmission schemes support transmission of only a single transport block in a TTI (such as a subframe), while some other transmission scheme support up to two transport blocks in a TTI. The reference signal or pilot signal associated with a transmission scheme for PDSCH demodulation may be a Common Reference Signal (CRS) or a UE-specific or dedicated DeModulation Reference Signal (DM-RS). A transmission scheme may be associated with a Downlink Control Information (DCI) format of a given payload size which includes the resource assignment and other control information for decoding the PDSCH. The DCI format may be transmitted on a PDCCH (Physical Downlink Control Channel) or an EPDCCH (Enhanced PDCCH) which includes CRC (Cyclic Redundancy Check) bits which may be scrambled by a particular C-RNTI configured for the device. Similarly, on the uplink, a UE may be configured a transmission mode from a plurality of transmission modes for PUSCH (Physical Uplink Shared Channel) transmission, such as transmission mode 1-2 in Rel-12 LTE. The PUSCH transmission schemes may include single antenna port and closed loop spatial multiplexing transmission schemes.

In one embodiment, a device can be configured with a low-latency transmission mode, such as a low latency downlink control information format where transmission (Tx) HARQ ACK can be sent in subframe n+2 instead of n+4, there can be a Transport Block (TB) size restriction, there can be a Timing Advance (TA) restriction that can limit the configuration of the smaller latency to small(er) cells, there can be a dedicated PDSCH resource like in Semi Persistent Scheduling (SPS), where the ACK/NACK feedback can be similar to Rel-8, such as a dynamic ACK/NACK based on a Control Channel Element (CCE) index, and where there can be a small maximum Code Block (CB) size, such as 1500 bits instead of 6144 bits, which can improve pipelining and/or reduce complexity. A maximum Code Block (CB) size can correspond to the largest information payload size that can be channel encoded for transmission on a particular physical channel, such as PDSCH before the information payload is segmented in to multiple code blocks. A transport block can include one or more code blocks.

For example, a device may be configured via higher layers with a low-latency transmission mode or a low-latency feature. In such a case, the device may be required to transmit the HARQ feedback faster than a Rel-8 device, such as for a Downlink (DL) grant for PDSCH received in subframe n, the device may be required to transmit the corresponding HARQ-ACK feedback in subframe n+2 instead of subframe n+4. This can imply that the device processing time for a PDSCH can be reduced from 3-TA to 1-TA. To ensure that the device complexity is not adversely impacted by this shortened processing time, there may be restrictions imposed on TB size, and/or the TA value supported at the device for low-latency operation. For very short transport blocks, a dedicated PDCCH resource, like in Semi-Persistent Scheduling (SPS), can be directly assigned to PDSCH. This can allow the device to start detecting and decoding the PDSCH early and to send the uplink feedback much faster.

According to a related implementation, the device can be configured with a low latency DCI format that can work with any transmission mode. Up to three or more Orthogonal Frequency Multiplexed (OFDM) symbols can be used for a control region. Data can be sent on Control Channel Elements (CCE's) for small packets of data. An ACK can be sent in subframe n+2 is response to data on a Physical Downlink Control Channel (PDCCH). In this implementation, a device may be configured via higher layers with a low-latency transmission mode or a low-latency feature. For small packets, the PDSCH that typically occupies the entire 1 ms TTI can instead be sent on CCE's comprising the PDCCH or control region. Since the control region can occur in the first 1-3 OFDM symbols of a 1 ms TTI, the data sent on the CCE's can be decoded much earlier, such as after a device receives 3 OFDM symbols rather than after device receives all 14 OFDM symbols of a 1 ms TTI. Due to this early decoding benefit, the device can then transmit the uplink feedback earlier, such as in subframe n+2, or in slot 2 of subframe n+1. The typical payloads that can be sent can be around 100 bits or so, and they can take advantage of the control channel decoder implemented in devices. The PDSCH data can be distinguished from the DCI based on Cyclic Redundancy Check (CRC) masking with a different CRCs. This can allow for reduced complexity, no change to existing PDSCH structure, such as TTI duration, RS, mapping, etc., only HARQ timing may be modified, and small low-latency packets can be transmitted through a PDCCH structure.

Figure 3:
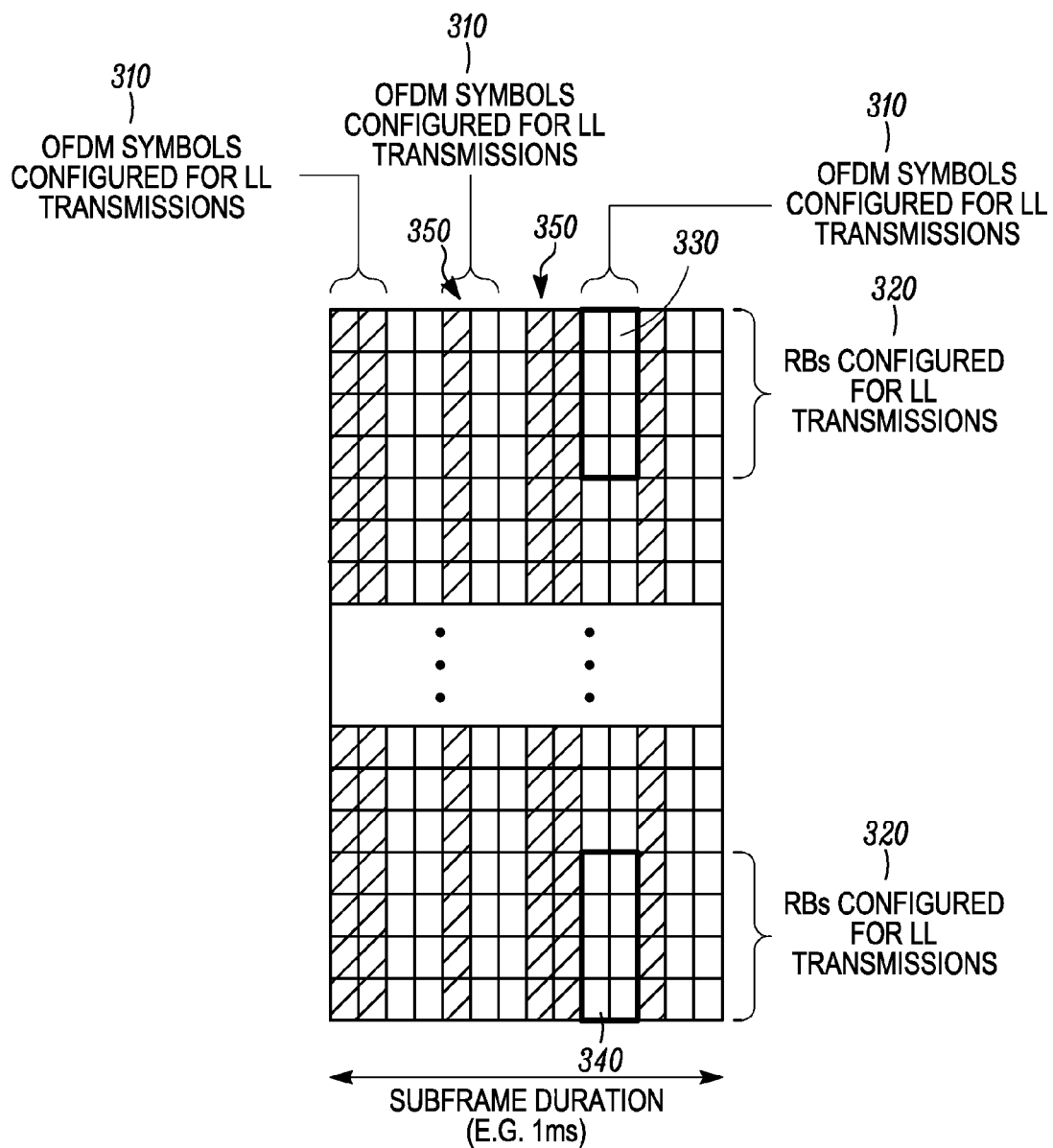
FIG. 3 is an example illustration of a subframe according to a possible embodiment.

FIG. 3 is an example illustration of a subframe 300 according to a related possible embodiment. The subframe 300 can include OFDM symbols 310 configured for low latency transmissions, resource blocks 320 configured for low latency transmissions, a first set of resource elements 330, such as first Low latency Channel Elements (LCE0), which can also be known as Data Channel Elements (DCE's), and a second set of resource elements 340, such as a second LCE1. The resource blocks configured for low latency transmissions may be localized physical resource blocks, localized virtual resource blocks, or distributed virtual resource blocks. Localized Virtual Resource Blocks (VRB) can be mapped directly to physical resource blocks, while distributed virtual resource blocks may be mapped to physical resource blocks in a predetermined manner such that contiguous distributed resource blocks are mapped to non-contiguous physical resource blocks with the location of the non-contiguous physical resource block in each slot being different. The resource blocks configured for low latency transmissions may be defined in terms of Resource Block Groups (RBGs), localized VRBs from one or more RBG subsets, or distributed VRBs. A RBG may be a set of consecutive virtual resource blocks (VRBs) of localized type. The Resource block group size (P) may be a function of the system bandwidth. A RBG subset p, where 0≤p<P, can include every Pth RBG starting from RBG p. A LCE typically can include multiple REs and the REs corresponding to the LCE need not be contiguous in time or frequency domain. A LCE can also be spread out between multiple RBs and even spread out between multiple Resource Block Groups (RBGs) including multiple RBs. In one embodiment, a LCE may comprise REs in a RBG in one or more OFDM symbols configured for low latency data packet transmission. In another embodiment, a LCE may comprise REs in a subset of localized VRBs from one or more of the P RBG subsets in one or more OFDM symbols. The subset of localized VRBs may correspond to VRBs in different RBGs. In another embodiment, a LCE may comprise REs in a subset of distributed VRBs in one or more OFDM symbols. The subset of distributed VRBs may be contiguous VRBs which as a result map to physical RBs that are distributed. A single symbol configured for low latency packet transmission can include multiple LCE's in different RB's configured for low latency packet transmission in the symbol. Low latency data packets can be on any of the symbols configured for low latency packet transmission, such as a subset of the symbols and can also be on a subset of RB's configured for low latency packet transmission. In some cases all the OFDM symbols and RBs in a subframe may be potentially used for low latency transmission and separate configuration signalling may not be necessary. In such cases, OFDM symbols 310 can be all the OFDM symbols in the subframe. Similarly, RBs 320 can be all the RBs in the subframe. Some of the OFDM symbols 350 can include common reference signals, like pilot RE's, on some of the RE's in the symbols 350.

In one embodiment, similar to the control channel structure described above in terms of search space and aggregation levels, a UE, such as a device, may be configured via higher layer signalling to monitor for low latency (LL) data packets with one or more Low latency Data Information (LDI) format(s) in a subset of the LCEs at a particular LCE aggregation level, L, (e.g., L=1, 2, 4 or 8 LCEs). The set of aggregated LCEs from the subset of the LCEs at a particular LCE aggregation level, L, can correspond to the set of low latency data candidates at the aggregation level L that the particular device monitors in a search space corresponding to subset of the LCEs at the particular LCE aggregation level, L. The device can monitor a set of low latency data candidates at a given aggregation level for low latency data packet where monitoring implies attempting to decode each of the low latency data candidates in the set according to all the monitored LDI formats. The device can determine successful decoding of data payload of a low latency data packet corresponding to a low latency data candidate by using an identifier associated with the UE such as C-RNTI or LL-RNTI which masks or scrambles the Cyclic Redundancy Check (CRC) of the data payload. In some embodiments, a hashing function may be used to find the low latency data candidate locations in each search space. The hashing function may be based on the UE RNTI (identifier associated with the UE, such as C-RNTI or LL-RNTI), aggregation level (L), the total number of LCEs available (Nlce), the OFDM symbol number or index, and the maximum number of low latency data candidates for the search space. In one method of determining the LCE locations $S_k^{(L)}$ corresponding to a low latency data candidate m of each aggregation level L (e.g., L=(1, 2, 4, or 8)), the search space for OFDM symbol 'k' of a subframe is given by equation:

$$S_k^{(L)} = L\{(Y_k+m) \bmod (\lfloor N_{LCE,k}/L \rfloor)\} + i \quad (2)$$

where $Y_k = 39827 \cdot Y_{k-1} \bmod 65537$ where $Y_{-1} = n\_RNTI$ for the UE specific search space;

$n\_RNTI \neq 0$ is for example, C-RNTI or temporary C-RNTI or LL-RNTI; $N_{LCE,k}$ is the number of total LCEs available for OFDM symbol k;

$m = 0, \ldots, M^{(L)}-1$ where $M^{(L)}$ is the number of low latency data candidates to monitor in the search space at aggregation level L; and $i = 0, \ldots, L-1$ where i spans each consecutive LCE of the low latency data hypothesis.

Figure 4:
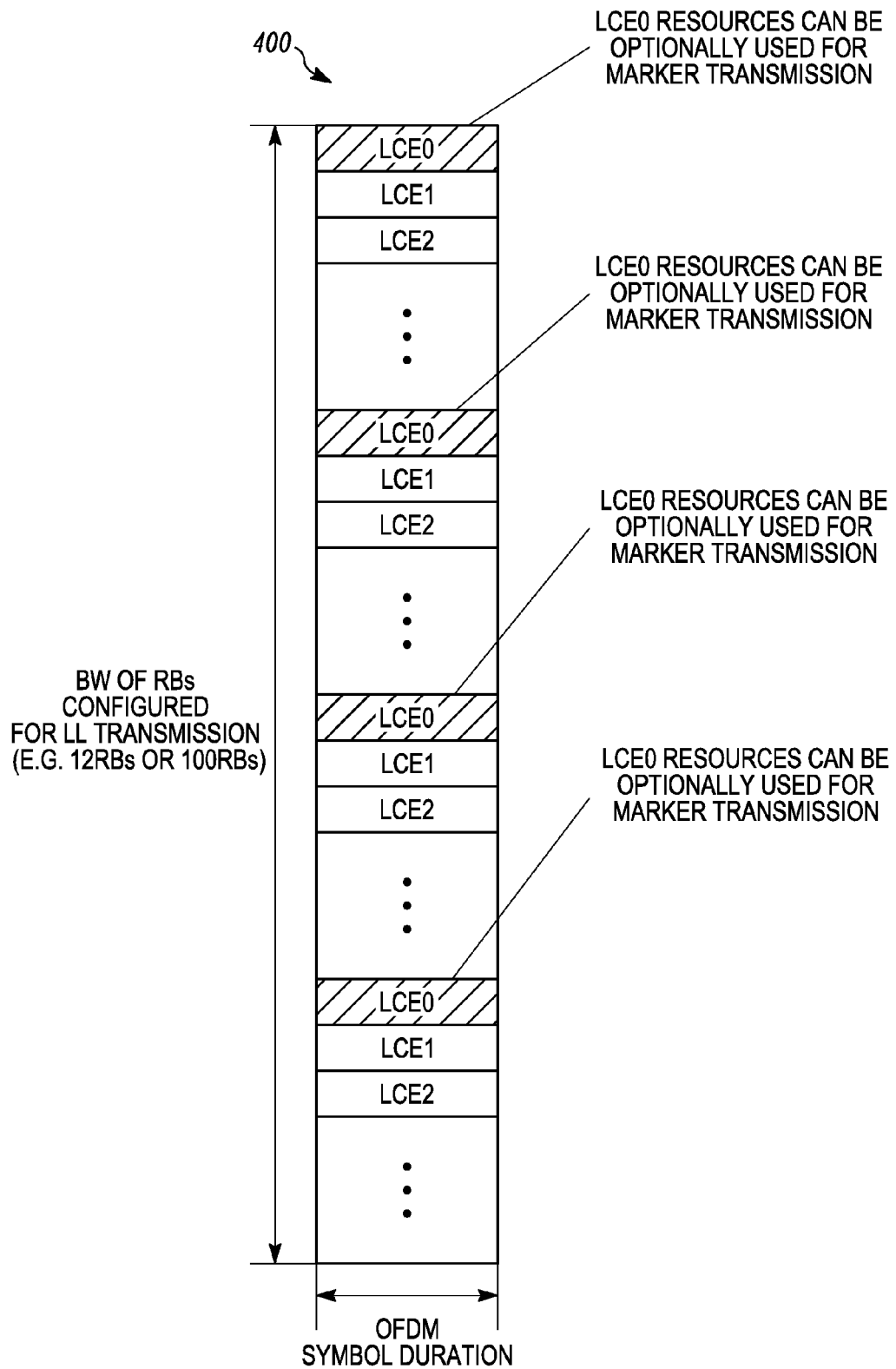
FIG. 4 is an example illustration of an orthogonal frequency multiplexed symbol according to a possible embodiment.

FIG. 4 is an example illustration of an OFDM symbol 400 according to a related possible embodiment. The OFDM symbol can be one of the OFDM symbols configured for low latency transmission in a subframe. The OFDM symbol 400 can include LCE's LCE0, LCE1, and LCE2, as well as other elements. Also, the OFDM symbol 400 can have a bandwidth of RB's configured for low latency transmission, such as 12 RBs, 100 RBs, and other numbers of RB's. The LCE resources can optionally be used for marker transmission that can act as a type of control signal. For example, a marker transmission can be an indicator channel that indicates whether the OFDM symbol is used for low latency traffic. The marker can also provide information indicating the REs or sets of REs (e.g. RBGs, RBs or LCEs). The marker transmission can be sent as a broadcast transmission common to multiple devices. For a device not receiving low latency transmission in that subframe, but having an allocation for other data transmission, the marker transmission can tell which RE's in its allocation are used for low latency transmissions so that the device can ignore then, null them, or otherwise not use them.

Figure 5:
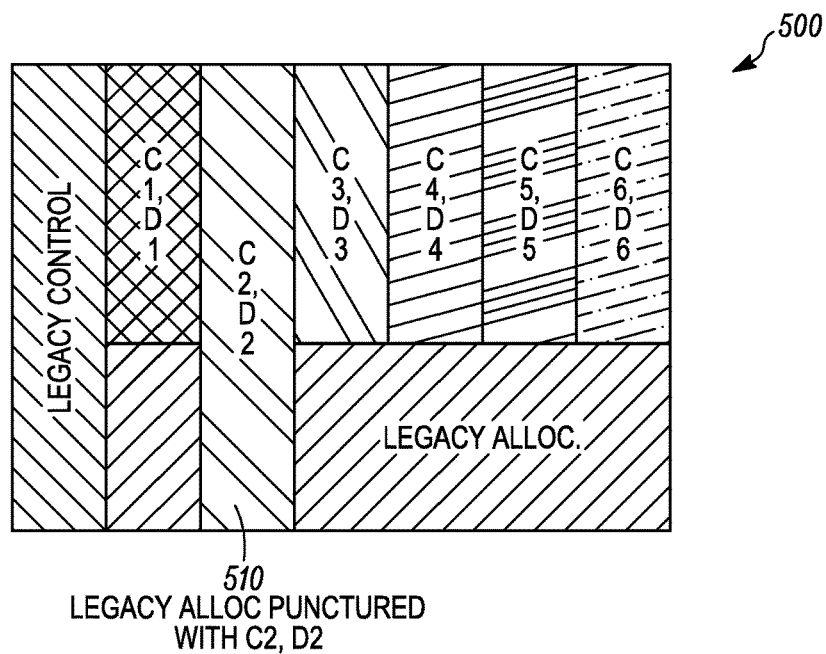
FIG. 5 is an example illustration of a transmission time interval according to a related embodiment.
Figure 6:
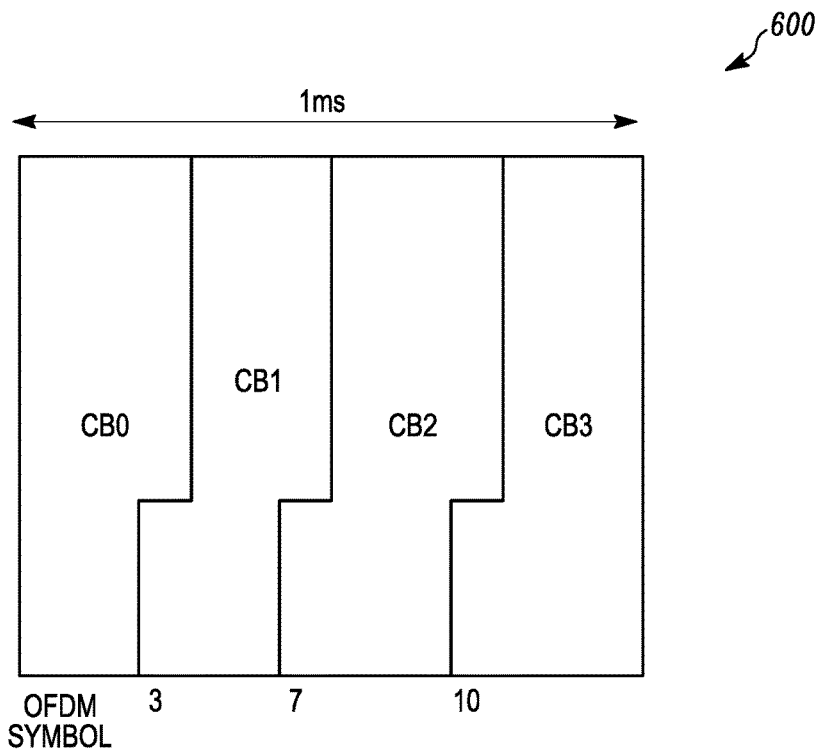
FIG. 6 is an example illustration of a transport block according to a possible embodiment.

FIG. 5 is an example illustration of a Transmit Time Interval (TTI) 500 according to a related possible embodiment. The TTI 500 shows mixing legacy with low latency allocations in one legacy TTI. For example, a new TTI can be 2-symbols long in duration. The legacy TTI 500 can include low latency control information C and low latency data D. For example, C1 can be control information for a first device and D1 can be data for the first device, etc. The illustrated areas, such as C1, D1, may also just have data without control information. The low latency data and control information can coexist with legacy allocations, such as in a 1 ms legacy TTI. The legacy allocation can be punctured 510 to accommodate a short TTI.

According to one of these possible embodiments, a device such as device 110 can receive a higher layer configuration message indicating a set of Resource Blocks (RB's) for receiving data packets in at least one symbol of a subframe. The higher layer can be higher than the physical layer. The device can attempt to decode a data packet in a first set of RE's, such as those corresponding to a first Low Latency Channel Element (LCE0), within the set of RB's. The first set of RE's can be in the at least one symbol of the subframe. The device can attempt to decode the data packet in at least a second set of RE's, such as those corresponding to a second LCE1, within the set of RB's. The second set of RE's can be in the at least one symbol of the subframe, where the second set of RE's can include at least one RE that is not in the first set of RE's. The device can successfully decode the data packet in one of the first set of RE's and the second set of RE's. The device can deliver a data payload of the decoded data packet to an application layer.

For example, according to a possible implementation, a device can be configured with Low Latency transmission mode in a PDSCH, such as a data region of a regular LTE subframe. The device can look in a search space in PDSCH region for small packets in a subframe n and can provide an ACK in a subsequent subframe n+m. As a further example, a device can be configured via higher layers with a low-latency transmission mode or a low-latency feature. For small packets, the PDSCH can be sent on Data Channel Elements (DCE's), such as LCE's, in the PDSCH region. For a small packet transmission, there may be no need for sending an additional control channel associated with it. For example, for sending a packet of 100 bits, a DCI format of length 40-50 bits can imply an overhead of 50%. Small packets can be decoded faster by a decoder as the payloads can be smaller. Due to this early decoding benefit, a device can then transmit the uplink feedback earlier, such as in subframe n+2. The typical payloads that can be sent can be around 100 bits or so, and can take advantage of the control channel decoder implemented in devices, such as with CRC masking with different CRC's and using search space similar to that defined for control channels and as described above. This can provide reduced complexity with minimal or no change to existing PDSCH structure, such as TTI duration, Reference Signals (RS), mapping, etc., only HARQ timing may be modified, small low-latency packets can be transmitted through PDSCH small RB allocations, and a device can blind decode multiple PDSCH candidates to detect PDSCH.

According to one embodiment, a device, such as a base station device 120, can transmit a resource assignment that can assign a first set of time-frequency resources in a subframe for regular latency data transmission. For example, the first set of time-frequency resources can be a set of RBs in the subframe. The resource assignment can be transmitted using DCI of a control channel such as PDCCH or EPDCCH. The device can transmit low latency data within a second set of time-frequency resources in the subframe. For example, the second set of time-frequency resources can be a set of REs mapped to one or more OFDM symbols and one or more RBs in the subframe. Low latency data can have a lower latency than regular latency data. The second set can at least partially overlap with the first set. The device can transmit a marker signal, where the marker signal can indicate a presence of low latency data transmission in the subframe.

According to another related embodiment, a device, such as the device 110, such as a user equipment, can receive a resource assignment. The device can determine a first set of time-frequency resources in a subframe from the resource assignment. For example, the first set of time-frequency resources can be a set of RBs in the subframe. The resource assignment can be transmitted using DCI of a control channel such as PDCCH or EPDCCH. The device can determine a second set of time-frequency resources in the subframe. For example, the second set of time-frequency resources can be a set of REs mapped to one or more OFDM symbols and one or more RBs in the subframe. The second set of time-frequency resources can be used for a low latency data transmission and can overlap with at least a portion of the first set of time-frequency resources. The device can receive a regular latency data transmission in the subframe. The device can decode the regular latency data transmission in the subframe based on the determined first and second set of time-frequency resources, where the regular latency transmission can have a longer latency than the low latency transmission. The device can determine the second set of time-frequency resources by receiving a marker signal. Alternately, the device can determine the second set of time-frequency resources by decoding the low latency transmissions.

According to a possible implementation, in order to support regular latency transmissions in the same subframe as low latency transmissions, a marker can be transmitted where the marker can indicate which RE's are used in the subframe for low latency transmission. This information can be used to determine which Log Likelihood Ratios (LLR's) should be zeroed out while decoding regular latency transmissions. Regular latency and low latency transmissions may be received by different users, such as devices and/or UEs, in the same subframe. Alternately, regular latency and low latency transmissions may be received by the same user in the same subframe, if the user is configured to receive both types of transmissions. Alternately, some users may be configured to receive regular latency transmissions in a first set of subframes and configured to receive low latency transmissions in a second set of subframes. The first set of subframes can be a subset of the second set of subframes. Regular latency transmissions can be transmitted in one or more RBs in the subframe. The RBs used for regular latency transmissions can be assigned via resource assignments and indicated using control channels. Since the same subframe can be used for both regular and low latency (LL) transmissions, the REs used for LL transmission and any marker transmissions may not be used for regular latency transmissions. The REs used for LL transmission and any marker transmissions can belong to the RBs assigned for regular latency transmissions.

The marker can be sent in predefined or preconfigured locations in the subframe. The possible locations of marker transmission can be indicated to the user equipment via higher layer (e.g. RRC) signalling. If some OFDM symbols in the subframe are configured for low latency transmissions, in some implementations, the marker signal can be sent only on those OFDM symbols. For example, the marker signal can be sent in OFDM symbols 310. A user equipment attempting receive transmissions other than low latency transmissions in the same subframe can decode the marker to determine the REs used for low latency transmissions. For example, the user equipment can determine the OFDM symbols 310 configured for low latency transmission. Within each such OFDM symbol, for example OFDM symbol 400, the low latency transmissions can be made in some REs. The REs can be further organized as LCEs or DCEs or CCEs. For example, as shown in the OFDM symbol 400, low latency transmissions can be made on resources or REs corresponding to LCE0, LCE1, LCE2. While the OFDM symbol 400 shows LCEs created from REs in one symbol, it is also possible to create LCEs by using REs from multiple adjacent OFDM symbols or multiple non-adjacent OFDM symbols. In some implementations, a subset of LCEs in each OFDM symbol configured for LL transmission, for example LCE0 in OFDM symbol 400, can be used for marker transmission. Generally, the base station may only use a portion of REs in the OFDM symbols and RBs configured for low latency transmission in a subframe. The base station can use the marker transmission to signal information indicating the REs used for LL transmission in each particular subframe. For example, the marker transmission can indicate which LCEs in a OFDM symbol are used for LL transmission. Alternately, the marker transmission can indicate which RBs or RBGs of an OFDM symbol are used for LL transmission. A marker transmission in one OFDM symbol may indicate the REs/LCEs/DCEs/CCEs/RBs/RBGs used for low latency transmission in other OFDM symbols of the subframe.

Figure 21:
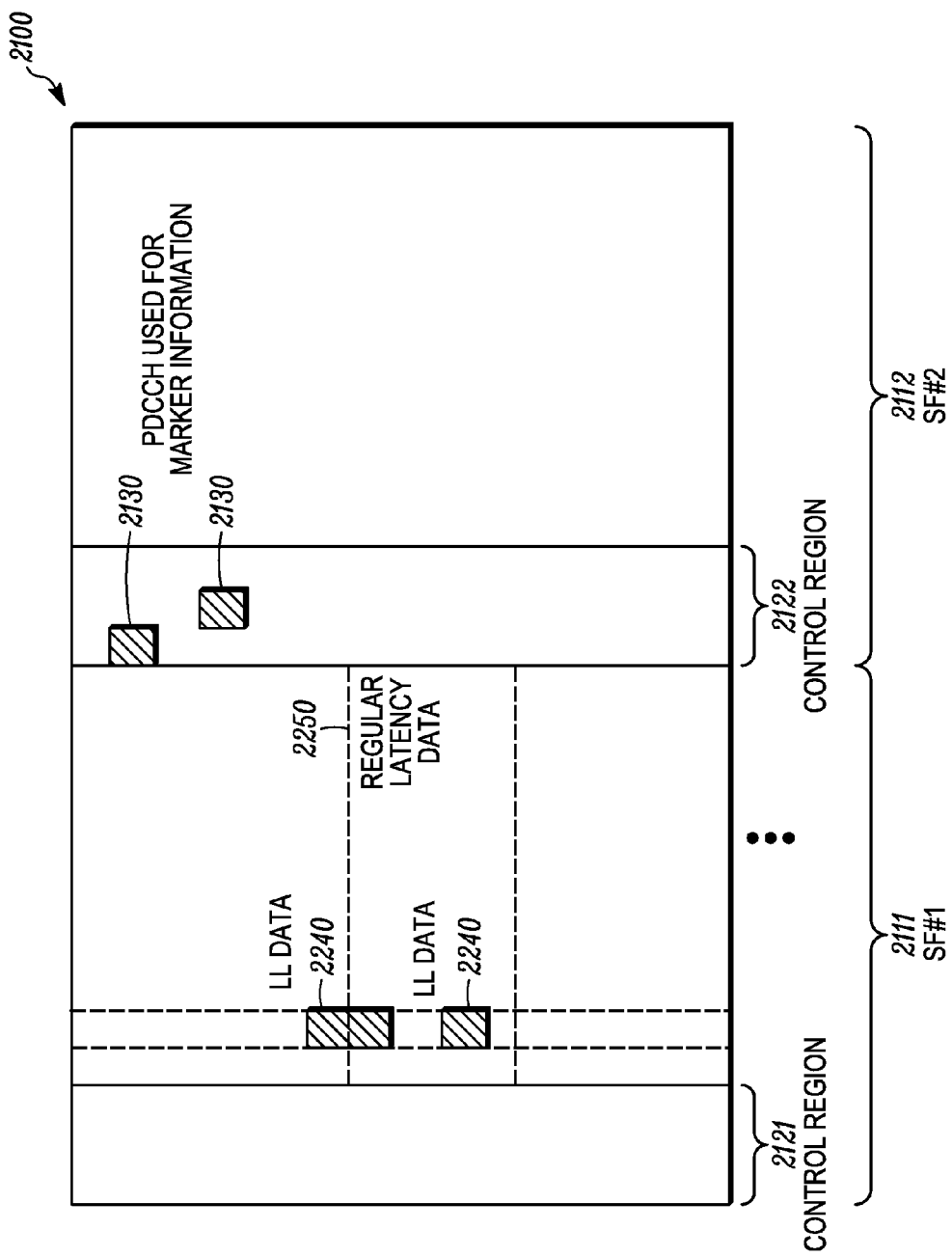
FIG. 21 is an example illustration of subframes according to a possible embodiment.

FIG. 21 is an example illustration 2100 of a first subframe 2110 and a second subframe 2112 according to a possible embodiment. The first subframe can include a control region 2121, low latency data 2240, and a regular latency data region 2250. The second subframe 2112 can include a control region 2122 including a marker 2130. A marker transmission 2130 in one subframe 2112 (e.g. subframe n+1) may indicate the REs/LCEs/DCEs/CCEs/RBs/RBGs used for low latency transmission in OFDM symbols of another subframe 2121 (e.g. subframe n). In such cases, the marker transmission 2130 in subframe n+1 2112 can be sent in the first few OFDM symbols (e.g. symbols in the control region 2122), to reduce decoding latency of the device receiving the marker 2130. When the marker 2130 is sent using symbols in the control region 2122, information conveyed using the marker 2130 can be sent using control channels, such as PDCCH or PHICH, that are typically used in the control region. If PDCCH is used for marker transmission, the marker transmission can be differentiated from other control channel transmissions by using a special CRC mask (e.g. marker-RNTI) for the marker transmissions. If PHICH is used for marker transmission, one or more of the PHICH groups can be preconfigured or predefined to be used for marker transmissions.

Considering implementation complexity, and decoding delay, of devices (e.g. user equipment) receiving the marker transmissions, it can be useful to transmit the marker in every OFDM symbol configured for LL transmission in a subframe. However, since the device (e.g. base station or eNB) transmitting the marker may not actually transmit LL transmissions in all the configured OFDM symbols configured for LL transmission, it may be useful (from an overhead reduction perspective), to transmit the marker only those OFDM symbols that are actually used for LL transmission in the subframe. In such cases, transmission of a marker signal can implicitly indicate the presence of LL transmissions, while absence of transmission of a marker signal can implicitly indicate the absence of LL transmissions. In other cases, where the marker is transmitted in every OFDM symbol configured for LL transmission, the presence or absence of LL transmissions can be explicitly indicated (e.g. by using one bit or one code point) by the marker transmission.

Figure 20:
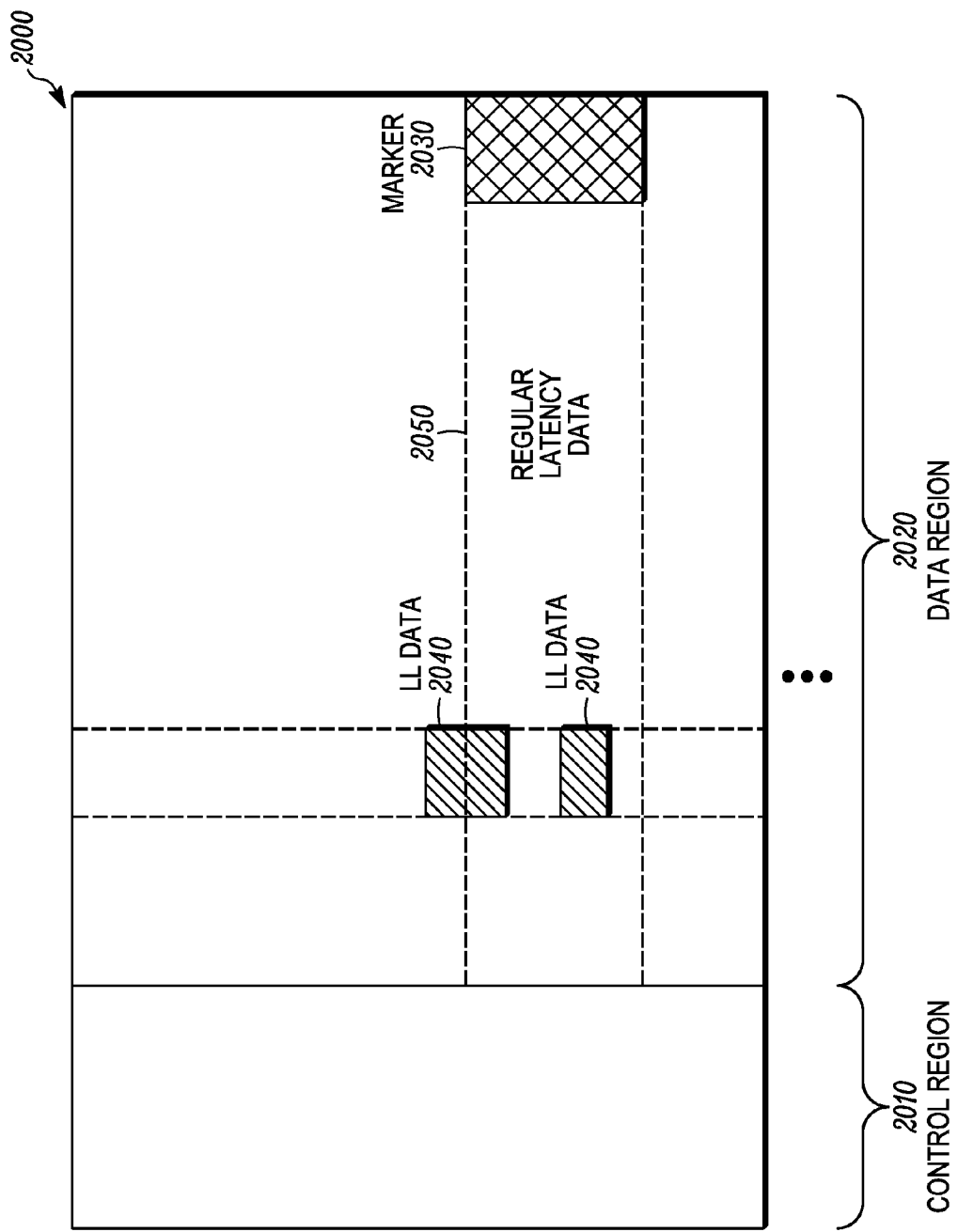
FIG. 20 is an example illustration of a subframe according to a possible embodiment.

FIG. 20 is an example illustration of a subframe 2000 according to another possible implementation. The subframe 2000 can include a control region 2010, a data region 2020, a marker 2030, low latency data resource elements 2040, and a regular latency data region 2050. According to this implementation, the marker transmission 2030 can be sent by puncturing the RBs assigned for regular latency transmission 2050. For example, a set of PDSCH RBs can be assigned to a user in a subframe. Some REs within an OFDM symbol (e.g. the last OFDM symbol) of one or more of those RBs can be used for marker transmission. If multiple users are assigned PDSCH RBs in the same subframe, then a separate marker transmission for each user can be sent within the assigned RBs of each user. The marker transmission can be sent by puncturing the user's PDSCH allocation. The puncturing can be similar to a LTE mechanism where ACK/NACK and Rank Indicator (RI) bits are transmitted by puncturing the PUSCH allocation. The marker may be transmitted using a predefined mapping within the user's assigned RBs, such as on the last symbol and on the higher end of the RB indices of the user allocation.

The information payload of marker transmission, such as 13 bits or 6 bits, can be used for identifying symbols, and other bits for identifying Resource Block Groups (RBG's) punctured within the user's, such as the device's, allocation. This can be optimized by grouping allocated RBG's and identifying only the top, middle, or other groupings within the user's allocation as being punctured.

The information payload of marker transmission can indicate which OFDM symbols within the user's assigned RBs are used for LL transmission. For example, this can be done using 13 bits or 6 bits with each bit corresponding to one or more OFDM symbols. The payload bits of the marker transmission may be used to identify Resource Block Groups (RBG's) that contain LL transmission within the RBs assigned for the user for receiving regular latency transmission. The payload can be further optimized by grouping the assigned RBs into RBG's and identifying only the top, middle, or other groupings that contain LL transmissions.

The marker transmission may only be sent if LL transmissions overlap resource allocations of users scheduled with a particular set of modulation of Modulation and Coding Scheme (MCS) levels. For example, if the LL transmissions overlap only those resource allocations with low MCS levels (e.g. those corresponding to QPSK modulation and low coding rate, such as <0.8), the marker signal may not be transmitted. If the LL transmissions overlap resource allocations with high MCS levels (e.g. those corresponding to 64 QAM or higher modulation), the marker signal can be transmitted. In another example, no marker may be used for low MCS, such as MCS<10.

According to a possible implementation, a device (e.g. user equipment 110) can receive a subframe with both regular latency and low latency transmissions. The device may be configured to receive both regular and low latency (LL) transmissions in the same subframe. Alternatively, while the subframe can contain both regular latency and low latency transmissions, the device may be configured to decode only regular latency transmissions. However, even if the device is decoding only regular latency transmissions, it can be useful for the device to take into account the presence of LL data transmissions in the subframe to more accurately decode the regular latency data transmissions. Accordingly, the device can receive a resource assignment. The device can determine a first set of time-frequency resources from the resource assignment. For example, the first set of time-frequency resources can the REs corresponding to PDSCH RBs assigned to the device for receiving data transmissions. The data transmissions can be regular latency data transmissions. The device may receive the resource assignment on a control channel such as PDCCH/EPDCCH. The device can determine a second set of time-frequency resources in the subframe. The second set of time frequency resources can overlap with at least a portion of the first set of time-frequency resources and the second set of time frequency resources can be used for low latency (LL) data transmissions. For example, the device may be assigned RB1, RB2, RB3, RB4, RB5 in both 0.5 ms time slots of a 1 ms subframe for receiving regular latency transmissions. Each RB can span all the OFDM symbols in a time slot. A LL transmission may span RB3, RB4, RB5, RB6, RB7, and RB8 in frequency domain and OFDM symbols 4 and 5 of the first slot of the subframe in time domain. The device can then determine the REs within RB3, RB4, and RB5 and OFDM symbols 4 and 5 of the first slot of the subframe as the second set of time-frequency resources.

The device can then decode the regular latency data transmissions in the subframe based on the first and second set of time-frequency resources. For the example given above, while decoding the data for regular latency data transmissions, the device can adjust the log likelihood ration (LLR) values of bits corresponding to the regular latency data transmission that were mapped to REs within RB3, RB4, and RB5 and OFDM symbols 4 and 5 of the first slot of the subframe to a low value. For example, the device can set the LLR values of those bits to zero. This can improve the probability that the device correctly decodes the data transmission assigned on PDSCH RBs RB1, RB2, RB3, RB4, and RB5. Such can operation can be useful if the MCS level used for the data transmission corresponds to a level with higher order modulation and higher coding rate (e.g. 64 QAM modulation or higher and code rate 0.7 or higher). If the MCS level used for the data transmission corresponds to a level with lower order modulation and lower coding rate (e.g. 16 QAM modulation or lower and code rate less than 0.7), the device may skip the step of determining the second set of resources and adjusting LLR values, and instead directly attempt to decode the regular data transmission according to the resource assignment.

In some implementations, the device may receive a marker signal. The device can use the marker signal to determine the second set of time-frequency resources. The device can determine the location of marker signal based on a pre-defined location of the marker signal. For example, the device may determine from RRC signalling that LL transmissions are expected in RB3-RB8 and RB91-RB96 in the frequency domain and OFDM symbols 4 and 5 of the first slot and OFDM symbols 0, 1, 4, and 5 of the second slot in the time domain of every subframe.

Figure 22:
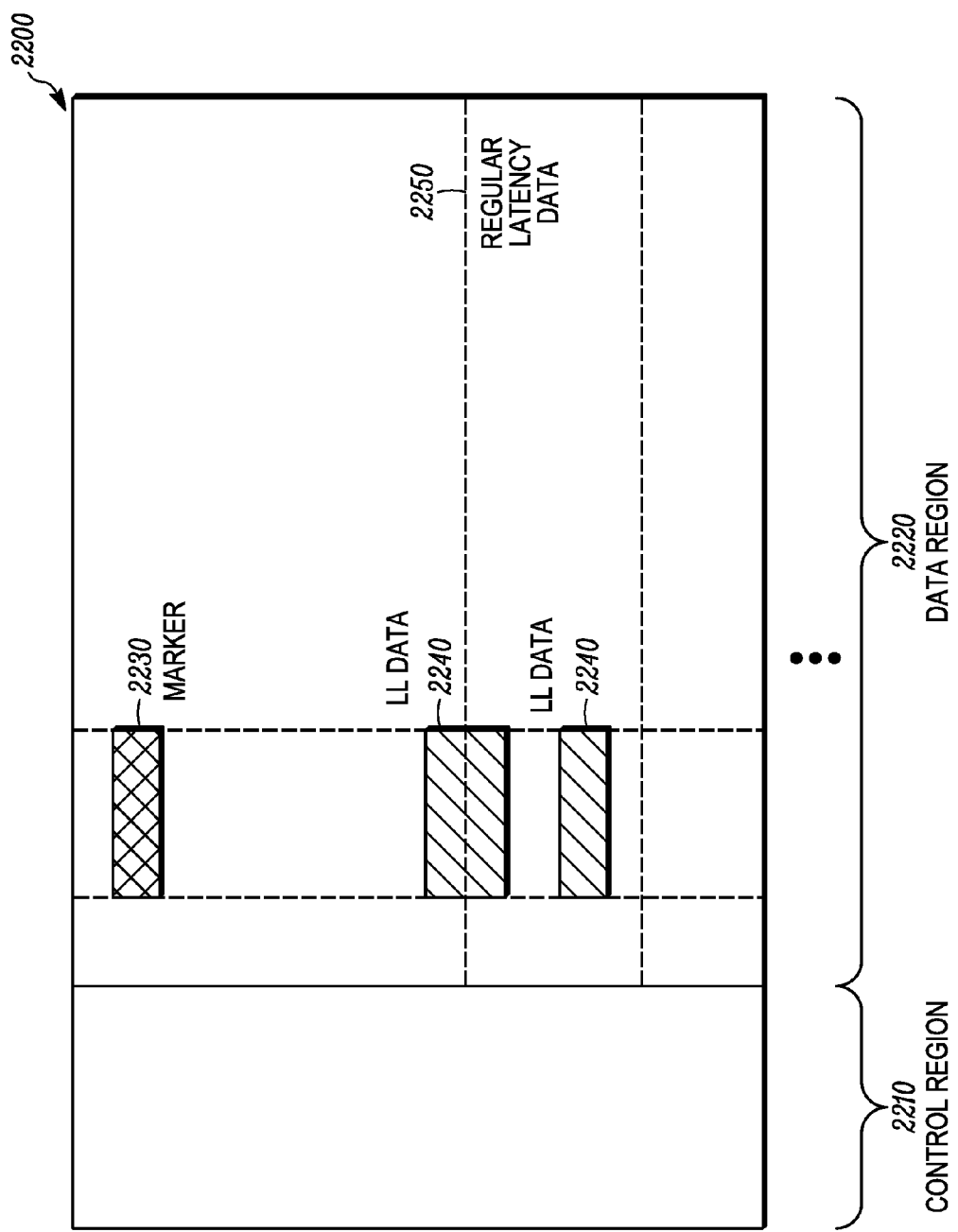
FIG. 22 is an example illustration of a subframe according to a possible embodiment.

FIG. 22 is an example illustration of a subframe 2200 according to a possible embodiment. The subframe 2200 can include a control region 2210, a data region 2220, a marker 2230, low latency data 2240 and a regular latency data region 2250. For a subframe where the device receives a resource assignment, the device can then determine that a marker signal can be present in RB0-RB2 in OFDM symbols 4 and 5 of the first slot and OFDM symbols 0, 1, 4, and 5 of the second slot in time domain of the subframe. In this example, the possible locations of a marker signal can be a predefined set of RBs (e.g. RB0-RB2) in every OFDM symbol configured for LL transmission. In another example, where LL transmissions are made using LCEs, the device can look for the marker signal in REs corresponding one or more predefined LCEs (e.g. marker is transmitted in LCE0 in OFDM symbols where LCEs with LL transmissions are possible).

After receiving the marker signal, by decoding the information payload in the marker signal, the device can determine the REs where LL transmissions are present, and the device can further determine which of those REs overlap with the REs assigned to the device for receiving regular latency data transmission. Therefore, the device can determine a second set of time-frequency resources in the subframe, the second set of time-frequency resources used for a low latency data transmission, and the second set of time-frequency resources overlapping with at least a portion of the first set of time-frequency resources based on the marker signal.

In some implementations, the device may be able to receive both regular and low latency (LL) transmissions in the same subframe. For example, the device may be assigned RB1, RB2, RB3, RB4, and RB5 in both 0.5 ms time slots of a 1 ms subframe for receiving regular latency transmissions. The REs corresponding to these RBs can be considered as a first set of time-frequency resources. The device may successfully decode a LL transmission that spans RB3, RB4, RB5, RB6, RB7, and RB8 in the frequency domain and OFDM symbols 4 and 5 of the first slot of the subframe in the time domain. The REs on which the LL transmission is decoded can be considered as a third set of time-frequency resources. The device can then determine a second set of time-frequency resources as time-frequency resources belonging to both the first set of time-frequency resources and the third set of time-frequency resources. For example, the REs within RB3, RB4, and RB5 and OFDM symbols 4 and 5 of the first slot of the subframe can be considered as the second set of time-frequency resources. The device can then decode the regular latency data transmission by setting the LLR=0 for bits mapped to the second set of time-frequency resources.

In such implementations, a separate marker signal transmission may not be required. Furthermore, in such implementations, the LL transmissions can be made decodable also by devices that are configured to decode regular latency transmissions (i.e., non-low latency devices). For example, all the LL transmissions can use the same CRC mask, and can be blindly decoded by both low latency device and non-low latency devices. However, the individual data payload of each low latency transmission can be scrambled so that even though non-low latency devices are able decode the LL transmissions, they cannot unscramble data payload bits, thereby ensuring the privacy of LL data payload. The non-low latency devices may attempt to decode only those LL allocations that can overlap with their PDSCH resource allocation for regular latency data transmission. If a LL allocation is successfully decoded, the non-low latency device can determine the overlapping REs with its regular latency allocation, and erase the LLR values, such as by zeroing them of the bits corresponding to the overlapping REs.

According to a possible embodiment, a device can receive a higher layer configuration. The higher layer configuration can be higher than a physical layer configuration. The higher layer configuration can indicate configuring the device with a low latency configuration for a low latency transmission mode in addition to a regular latency configuration for a regular latency transmission mode. The low latency transmission mode can have a shorter latency than the regular latency transmission mode. The device can receive a packet based on one of the low latency configuration and the regular latency transmission mode in a subframe n. The device can transmit a feedback packet in a following subframe n+p, where p<4 when the received packet is based on the low latency configuration. The following subframe n+p can be the $p^{th}$ subframe from the subframe n. The device can transmit a feedback packet in a following subframe n+4 when the received packet is based on the regular latency configuration. The following subframe n+4 can be the fourth subframe from the subframe n.

According to a possible implementation, in LTE, Code Block (CB) segmentation can be used to segment a large transport block in to smaller pieces and these small pieces are individually CRC-encoded, turbo coded, rate-matched, scrambled, and mapped to modulation symbols. For increased pipelining benefit, a single modulation symbol or RE may not contain bits from different code blocks. The code blocks for a given Transport Block (TB) can be mapped in a frequency-first mapping as shown in the TB 600. The TB 600 can assume a transport block segmented into four code blocks occupying the subframe. Assuming two Common Reference Signal (CRS) ports, a 50 RB system bandwidth, of the OFDM symbols 0-13 in a 1 millisecond TTI, symbol#{0,5,7,12} can have RE's for CRS. Thus, OFDM symbols other than {0,5,8,12} can have 12*50=600 RE's for data, while {0,5,7,12} can have 8*50=400 RE's. Typically, based on signals/channels (CRS, CSI-RS, CSI-IM, DRS, DMRS, PBCH, etc.), the number of RE's per any given OFDM symbol, or per any given resource block can be variable.

For channel estimation latency, if a device is required to demodulate PDSCH based on CRS, then for 1 ms TTI, the CRS channel estimation may not start until symbol 5 (~6*71 us=420 us), contributing a latency of 0.42 ms. This can imply, for code block 0 in the TB 600, the Log-Likelihood Radios (LLR's) cannot be generated until symbol 5, such as after CB0 is fully received. I.e., the RE's corresponding to CB0 are fully received by symbol 3, and the I/Q values for symbols 0-4 are waiting for symbol duration 4 and 5, after receiving symbol 5, and CRS channel estimation can be performed and then LLR's for CB0 can be generated to kick-start a turbo decoding process. It is possible to start early decoding by relying only on CRS in symbol 0. Typically, all the CRS RE's in a given subframe can be used for PDSCH demodulation. Also, cross-subframe channel estimation for CRS is not assumed here. For DMRS based channel estimation, a device may have to wait until at least symbol 7 for performing DMRS based channel estimation. Typically, DMRS from both slots can be used for improving channel estimation. To make possible improvements, more demodulation pilots can be introduced to aid early decoding and pilot for channel estimation may be received no later than corresponding data. Also, a demodulation pilot can be introduced in early locations. For example, DMRS can be transmitted in symbol 0,1 and symbol 7,8. This can cut DMRS channel estimation latency by almost 420 us. Additionally, Channel State Information Reference Signal (CSI-RS) and Channel State Information Interference Measurement (CSI-IM) may be required mainly for feedback purposes. Therefore, these reference signals can be transmitted in a flexible location where the device complexity can be dependent on the time between when CSI is measured and when it is to be reported.

Figure 7:
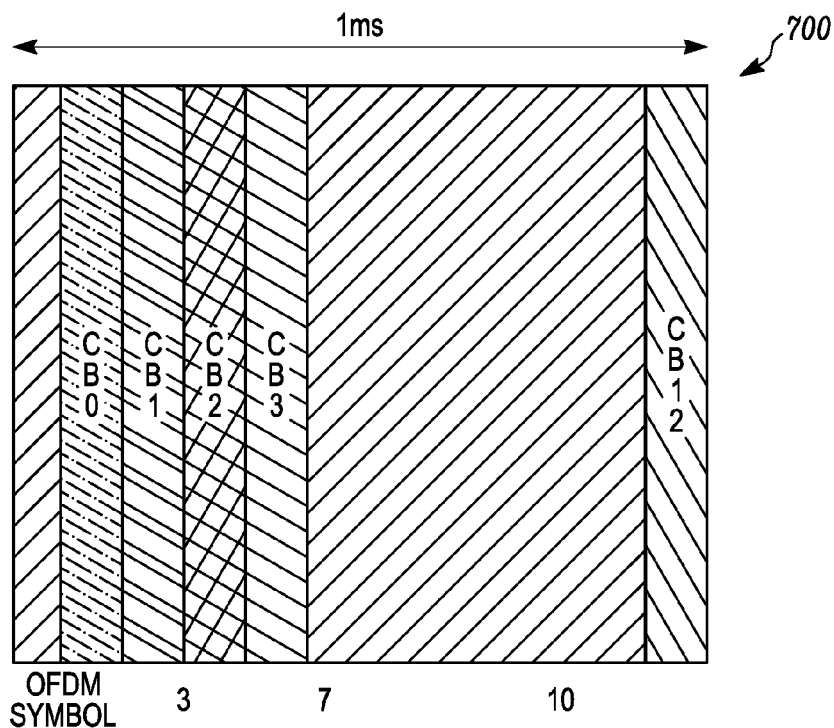
FIG. 7 is an example illustration of a transport block according to a possible embodiment.
Figure 8:
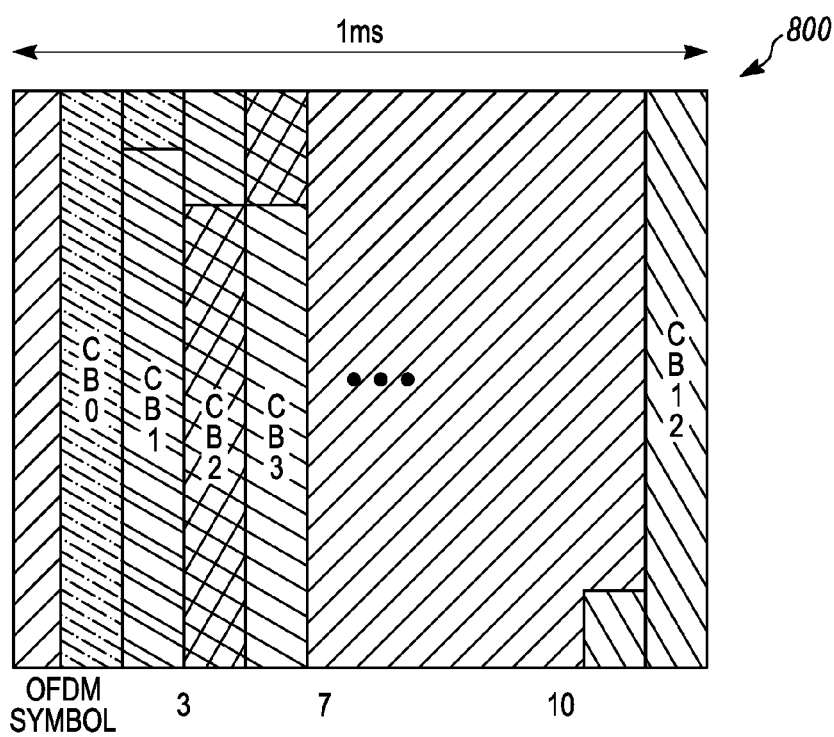
FIG. 8 is an example illustration of a transport block according to a possible embodiment.

FIG. 7 is an example illustration of a transport block 700 according to a possible embodiment. FIG. 8 is an example illustration of a transport block 800 according to a possible embodiment. The transport blocks 700 and 800 can have 13 code blocks and can occupy a 1 ms subframe, where the vertical dimension is frequency and the horizontal dimension is time. The transport block 700 can include code blocks CB0-CB12 occupying integer number of OFDM symbols. The transport block 800 can include code blocks CB0-CB12, where each code block can occupy one or more OFDM symbols. LTE can use code block-based transmitter and receiver operation for pipelined decoder implementation. If a Transport Block (TB) exceeding a size of 6120 bits (6144 with TB CRC) is to be transmitted, the transport block can get segmented into multiple code blocks, where each code block can have a CRC attached, can be turbo coded, can be rate-matched, and can be mapped to modulation symbols. This can allow for pipelined implementation, as each code block can be processed independently and sequentially, which can reduce complexity. HARQ feedback and retransmissions can typically be performed at a transport block level.

In LTE, a Transport Block Size (TBS) of 75376 bits corresponding to 5/6, 64 QAM, 100 RB allocation can be segmented into 13 code blocks, each of size 5824 bits (=(75376+(13+1)*24)/13, with 14 24-bit CRC's). The transport block 700 illustrates CB mapping to the 1 ms TTI. The mapping can be based on the total number of available RE's in the assigned resource blocks, such as in all assigned OFDM symbols. The available number of RE's can be affected by the amount of signals/channels, such as CRS, CSI-RS, CSI-IM, DRS, PSS/SSS, etc., present in the assigned resource blocks. Thus, a transport block can look like the transport block 800, where each code block may span one or more OFDM symbols.

A device configured with Low-Latency transmission mode, such as low latency DCI format, can transmit HARQ ACK in n+2 instead of n+4, can have a TB size restriction, can have a TA restriction that can limit the configuration of the smaller latency to small(er) cells, and can have dedicated PDSCH resource like in SPS. The ACK/NACK feedback can be similar to Rel-8, such as dynamic ACK/NACK based on control channel CCE index or as in SPS. The device can be configured via higher layers with a low-latency transmission mode or a low-latency feature. In such a case, the device may be required to transmit the HARQ feedback faster than a Rel-8 device. For example, for a downlink grant for PDSCH received in subframe n, the device may be required to transmit the corresponding HARQ-ACK feedback in subframe n+2 instead of subframe n+4. This can imply that the device processing time for a PDSCH can be reduced from 3-TA to 1-TA. To ensure that the device complexity is not adversely impacted by this shortened processing time, there may be restrictions imposed on the transport block size, and/or the timing advance value supported at the device for low-latency operation. For very short transport blocks, dedicated PDCCH resource like in Semi-Persistent Scheduling (SPS) can be directly assigned to the PDSCH. This can allow the device to start detecting and decoding the PDSCH early and to send the uplink feedback much faster. This can provide for reduced complexity complex with no or minimal change to the existing PDSCH structure, such as to TTI duration, RS, mapping, etc., can provide for only modifying HARQ timing, and can provide for some decoder relaxation via TA/TB restriction. In order to support low latency operation, the device can be configured with a transmission mode that uses restricted transport block sizes, restricted timing alignment, dedicated PDSCH resources like in SPS, and smaller maximum CB size, such as 1500 bits instead of 6144 used in LTE rel-13. To minimize collisions in the uplink, the device can be configured with an extended UL ACK/NACK region either on a slot level or symbol level based on the length of the TTI being used.

Figure 9:
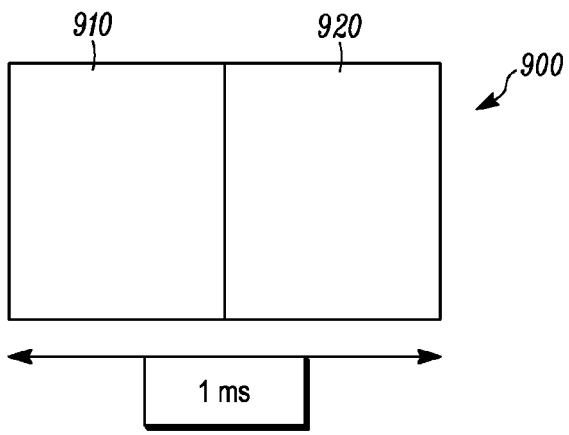
FIG. 9 is an example illustration of a subframe according to a possible embodiment.
Figure 10:
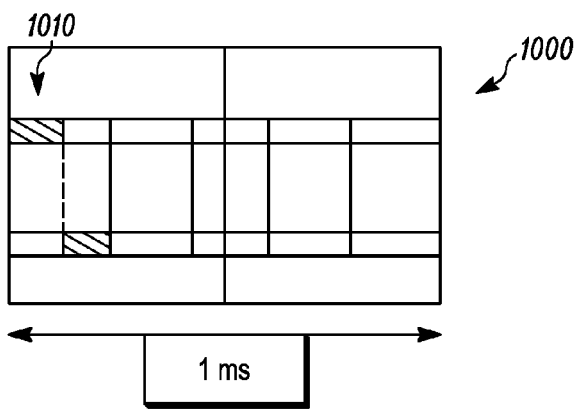
FIG. 10 is an example illustration of a subframe according to a possible embodiment.
Figure 11:
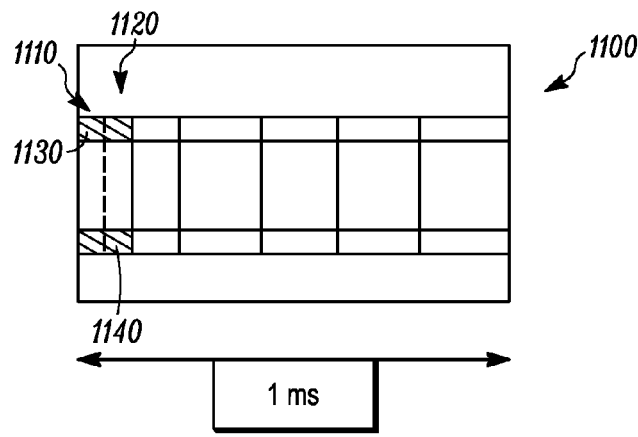
FIG. 11 is an example illustration of a subframe according to a possible embodiment.

FIG. 9 is an example illustration of a legacy or regular 1 ms uplink subframe 900 according to a possible embodiment. The subframe 900 can include two slots 910 and 920. FIG. 10 is an example illustration of a 1 ms uplink subframe 1000 and at least one 0.2 ms uplink subframe 1010 overlaid on the 1 ms subframe 1000 according to a possible embodiment. FIG. 11 is an example illustration of a 1 ms subframe 1100 according to a possible embodiment. The subframe 1100 shows another potential frame structure for an uplink wherein the subframe 1100 can include two symbols 1110 and 1120 with resource elements 1130 and 1140 assigned to a device for uplink feedback transmission in a multi-carrier cluster format. One symbol 1130 can be used for a pilot and one symbol 1140 can be used for an ACK/NACK.

Figure 12:
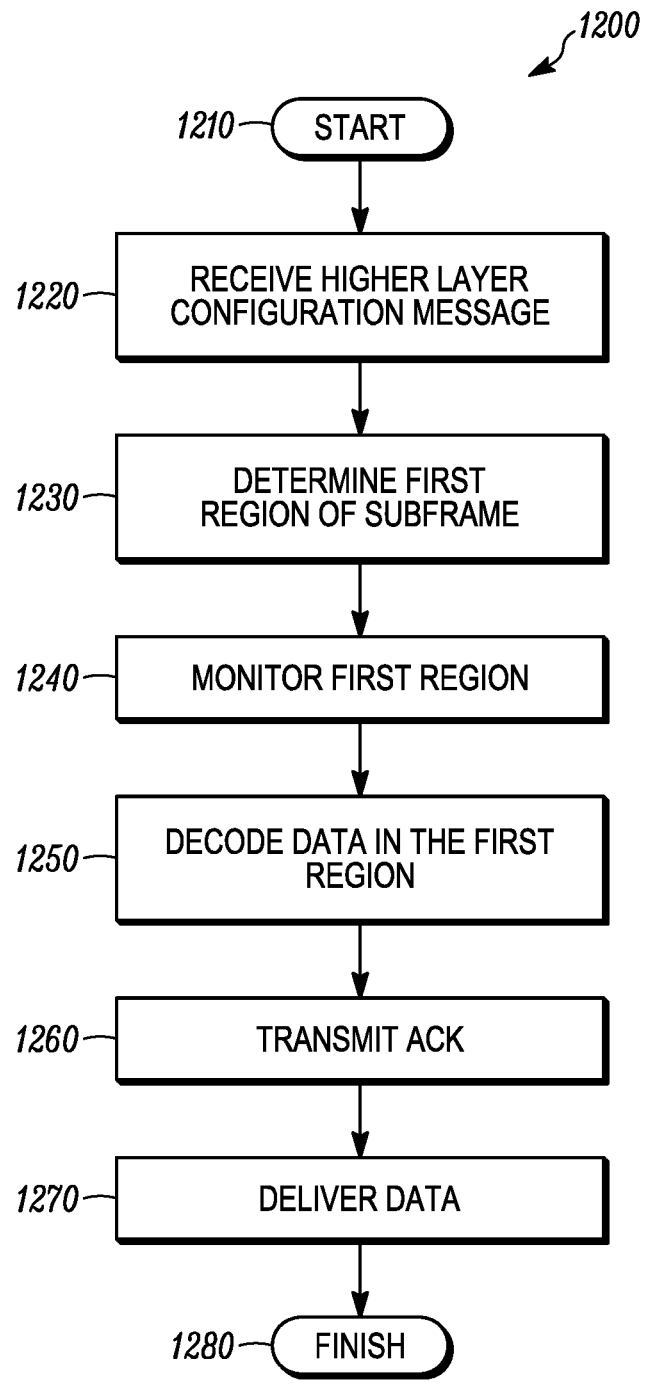
FIG. 12 is an example flowchart illustrating the operation of a device according to a possible embodiment.

FIG. 12 is an example flowchart 1200 illustrating the operation of a wireless communication device, such as the first device, according to a possible embodiment. At 1210, the flowchart 1200 can begin. At 1220, a higher layer configuration message can be received. The higher layer can be higher than a physical layer.

At 1230, a first region of a subframe for receiving data packets can be determined based on the higher layer configuration message. The first region can be a first time-frequency region in a sequence of regions. For example, the first region can be a first chronological region of a subframe, where the first region can include up to four multicarrier symbols. For example, a multicarrier symbol can be an OFDM symbol and a subframe can include up to 14 OFDM symbols. Also, a subframe can be one of ten subframes in a frame. The first region can include a first set of resource elements. The resource elements in the first set of resource elements can be used for low latency data packets, can be used for control signals, and/or can be used for other purposes. The first set of resource elements can be a subset of a second set of resource elements in the first region. The number of resource elements in the first set can be less than the number of resource elements in the second set. The first region can be used for control channel monitoring. For example, the first region can be a control region including at least one physical downlink control channel that includes control channel elements. The data packets can be transmitted on one or more of the control channel elements including resource elements from the first set of resource elements. Also, the data packets can be mapped to at least one resource element of the first set of resource elements.

The data packets in the first region can be low latency data packets that have a lower maximum allowed latency than normal latency data packets in a second region. The first region can be used for transmitting control signals for decoding the normal latency data packets in the second region. For example, normal latency data packets can be legacy data packets.

At 1240, the first region can be monitored. For example, control channel monitoring can be performed in the first region. Monitoring can include attempting to decode the data packets in the first region. For example, monitoring can imply, such as include, blind decoding data packets.

At 1250, data in the data packet in the first region can be decoded. The data packet can be a low latency data packet with a latency lower than a normal data packet. Also, successful decoding of a control channel in the first region can be determined using a first identifier. The first identifier can be a Cell Radio Network Temporary Identifier (C-RNTI) received in the higher layer configuration message. Successful decoding of data in the data packet in the first region can also be determined using a second identifier. The second identifier can be a Low Latency Radio Network Temporary Identifier (low latency-RNTI) received in the higher layer configuration message.

At 1260, an acknowledgement can be transmitted in a subframe with a first offset from a subframe in which the low latency data packet is received in response to successful decoding of low latency data packet. The first offset can be different from a second offset used for normal latency data packets. For example, the first offset can be two and transmitting an acknowledgement can include transmitting a hybrid automatic repeat request acknowledgement in a subframe with a first offset of two subframes n+2 from the subframe n in which low latency data packet is received. At 1270, the decoded data from the data packet in the first region can be delivered to an application layer. At 1270, the flowchart 1200 can end.

A variation on the above embodiment can include receiving a higher layer configuration message, the higher layer being higher than a physical layer. The higher layer configuration message can be received before the subframe discussed below. A first region of a subframe for receiving low latency data packets can be determined based on the higher layer configuration message. The first region can be a control region of a certain number of first symbols in a subframe. For example, the first region can be a control region including a physical downlink control channel including control channel elements. Low latency data packets can be transmitted on one or more control channel elements. Low latency can refer to how quickly data can be received correctly. For example, it can refer to the amount of time from a time a packet arrives at a base station to the time the packet is received at a UE. The latency can also refer to the round trip latency, such as from when a base station sends a packet to the time the base station receives a user equipment acknowledgement receipt of the packet.

The first region can be used for control channels that assign resource allocation for normal latency data packets in a second region after the first region in the subframe. Low latency data packets can have a lower maximum allowed latency than normal latency data packets. The first region can also be used for the low latency data packets.

Low latency data packets can be monitored in the first region in response to receiving the higher layer configuration. Monitoring can include attempting to decode a low latency data packet in the first region. For example, monitoring can imply blind decoding data packets. Attempting to decode data packets can include blind decoding data packets.

Data in the low latency data packet in the first region can be successfully decoded. An acknowledgement can be transmitted in a subframe with a first offset from a subframe in which the low latency data packet is received in response to successful decoding of low latency data packet, where the first offset can be different from a second offset used for normal latency data packets. For example, the first offset can be two and transmitting an acknowledgement can include transmitting a hybrid automatic repeat request acknowledgement in a subframe with a first offset of two subframes n+2 from the subframe n in which low latency data packet is received. The decoded data from the successfully decoded low latency data packet in the first region can be delivered to higher layers than a physical layer.

A transport block can be used that can include the number of information bits decoded from data resource elements in resource blocks allocated to a device excluding reference signals in the allocated resource blocks. Similarly the transport block can be the number of information bits encoded by a base station and sent on data resource elements in resource blocks allocated to a device. Packets can be mapped to transport blocks. A transport block can be segmented into more than one code blocks if the transport block size exceeds the maximum code block size. Packets can be used in higher layers and resource elements in resource blocks corresponding to the packet can be sent on the physical layer. A transmission time interval can indicate a time duration of a data allocation. For example, a transmission time interval can include one or more subframes.

Figure 13:
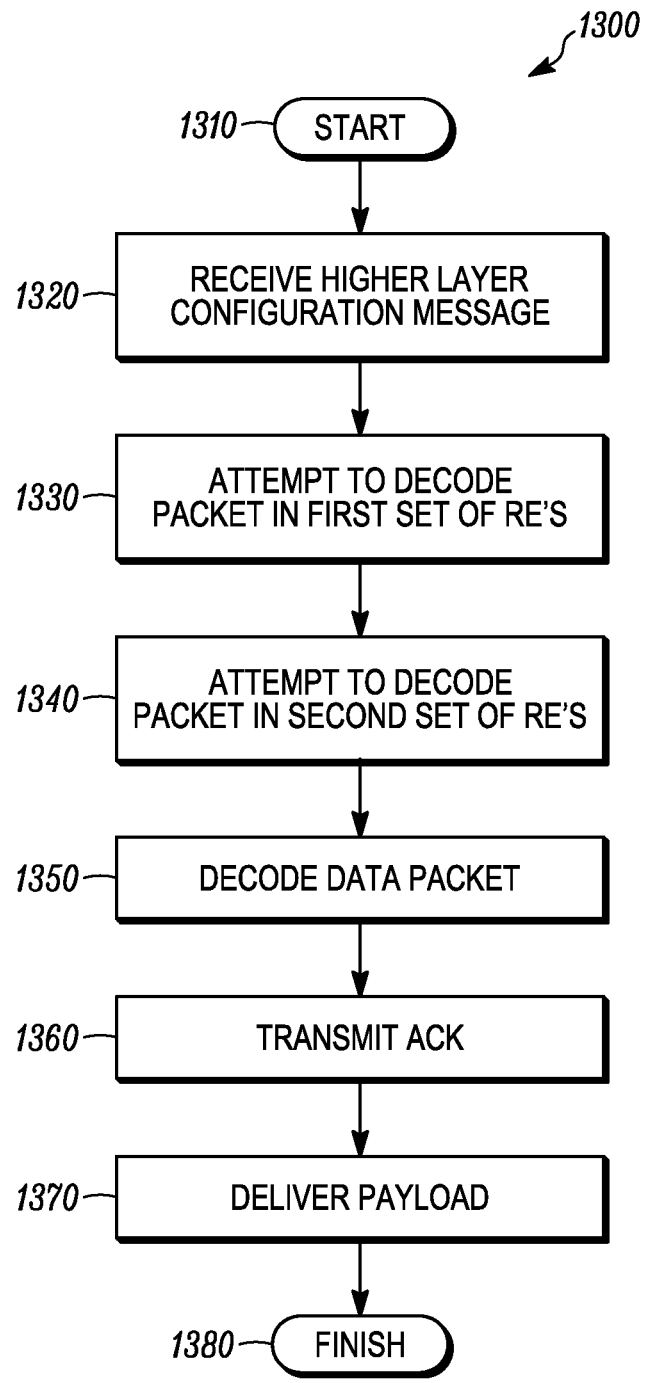
FIG. 13 is an example flowchart illustrating the operation of a device according to a possible embodiment.

FIG. 13 is an example flowchart 1300 illustrating the operation of a wireless communication device, such as the device 110, according to a possible embodiment. The flowchart 1300 can provide for looking for a data packet in different locations. Low latency data packets can be on any of the symbols configured for low latency packet transmission, such as on a subset of the symbols. The low latency data packets can also be on a subset of resource blocks configured for low latency packet transmission.

At 1310, the flowchart 1300 can begin. At 1320, a higher layer configuration message can be received. The higher layer configuration message can indicate a set of resource blocks for receiving data packets in at least one symbol of a subframe. The at least one symbol can be outside of a control region of a subframe. The higher layer configuration message can also indicate a set of candidate symbols in the subframe, the at least one symbol belonging to the set of candidate symbols, the set of candidate symbols being less than all of the symbols in the subframe. The higher layer configuration message can further indicate a location of the at least one symbol of the subframe.

At 1330, an attempt can be made to decode a data packet in a first set of resource elements within the set of resource blocks. Attempting to decode can mean monitoring and/or blind decoding. The first set of resource elements can be in the at least one symbol of the subframe. The first set of resource elements are not necessarily the first absolute resource elements in the set of resource blocks. The first set of resource elements can be a first Low latency Channel Element (LCE0) including the first set of resource elements within the set of resource blocks. A LCE can include resource elements in orthogonal frequency multiplexed symbols configured for low latency transmission in a resource block configured for low latency transmission. A LCE can also be spread out between multiple resource blocks and even spread out between multiple Resource Block Groups (RBG's) including multiple contiguous resource blocks. Also, a single symbol configured for low latency packet transmission can include multiple LCE's in different resource blocks configured for low latency packet transmission in a symbol. The first set of resource elements can further be a subset of resource elements used for control channel monitoring in a subframe, where the control channel can assign resources in a second region of the subframe for data. For example, the first set of resource elements can be in a control region of the subframe.

At 1340, an attempt can be made to decode the data packet in at least a second set of resource elements within the set of resource blocks. The first set of resource elements and second set of resource elements each can be in channel elements that include multiple resource elements that are not necessarily contiguous with each other in time and/or frequency. The second set of resource elements can be in the at least one symbol of the subframe. The second set of resource elements can include at least one resource element that is not in the first set of resource elements. The second set of resource elements can be a second Low latency Channel Element (LCE1) including at least the second set of resource elements a within the set of resource blocks.

A first number of resource elements in the first set of resource elements can be based on a first aggregation level. A second number of resource elements in the second set of resource elements can be based on a second aggregation level higher than the first aggregation level. The second set of resource elements can include the first set of resource elements and additional resource elements. The first set of resource elements may also be different resource elements than resource elements in the second set of resource elements. A number of the additional resource elements can be the same as the first number of resource elements in the first set of resource elements. For example, the aggregation level can be doubled, such as aggregation level 2. The number of additional resource elements can also be greater than the first number of resource elements, such as aggregation levels of 4 and 8.

At 1350, the data packet in one of the first set of resource elements and the second set of resource elements can be successfully decoded. At 1360, an ACK can be transmitted in response to successfully decoding the first packet. The subframe can be a first subframe and the ACK can be transmitted in a time-frequency resource in a second subframe with a first offset to the first subframe. For example, the second subframe can be n+2 from the first subframe n. According to a possible embodiment, the higher layer configuration message can indicate a set of resource blocks for receiving low latency data packets in at least one symbol of a subframe, the higher layer being higher than a physical layer. The data packet can be a low latency data packet. An attempt can be made to decode control information in the subframe, such as in a control region of the subframe. The control information can assign resources for receiving a normal latency data packet, where the normal latency data packet can have a longer latency that the low latency data packet. In response to decoding the normal latency data packet, an ACK/NACK can be transmitted in a third subframe with a second offset to the first subframe, where the second offset is greater than the first offset. At 1370, a data payload of the decoded data packet can be delivered to an application layer. At 1380, the flowchart 1300 can end.

Figure 14:
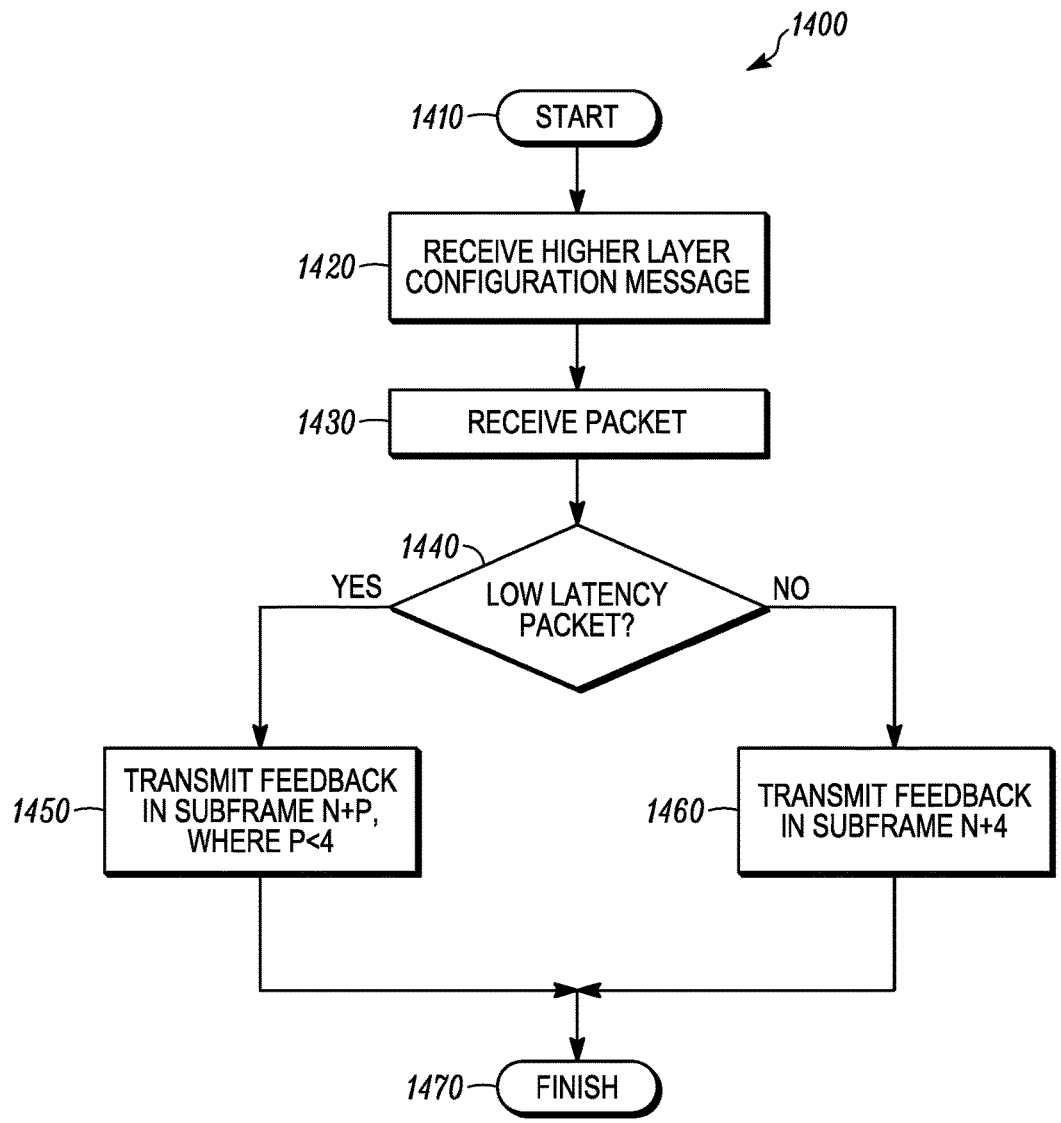
FIG. 14 is an example flowchart illustrating the operation of a device according to a possible embodiment.

FIG. 14 is an example flowchart 1400 illustrating the operation of a wireless communication device, such as the device 110, according to a possible embodiment. At 1410, the flowchart 1400 can begin. At 1420, a higher layer configuration can be received at the device. The higher layer configuration can be higher than a physical layer configuration. The higher layer configuration can indicate configuring the device with a low latency configuration for a low latency transmission mode in addition to a regular latency configuration for a regular latency transmission mode. The low latency transmission mode can have a shorter latency than the regular latency transmission mode. A transport block of the low latency configuration can be smaller than a transport block for the regular latency configuration. A code block size in a subframe for packets based on the low latency configuration can be smaller than a code block size for packets based on the regular latency configuration. For example, the code block size can be less than a regular latency code block size of 6144 bits. Also, a maximum timing advance value for the low latency configuration can be less than a maximum timing advance value for the regular latency configuration.

At 1430, a packet can be received based on one of the low latency configuration and the regular latency transmission mode in subframe n. The packet based on the low latency configuration can be received on a dedicated resource on a Physical Downlink Shared Channel (PDSCH). For example, for very short transport blocks, dedicated PDSCH resources, like in Semi Persistent Scheduling (SPS), can be directly assigned to the device. This can allow the device to start detecting and decoding the PDSCH early and to send the uplink feedback much faster because a control channel is not necessary, which can avoid latency from using control channel transmissions.

At 1440, a determination can be made as to whether the received packet is based on the low latency configuration or on a regular latency transmission. For example, the packet can be identified as being based on the low latency configuration based on the packet being received on a given transport bearer. A transport bearer can be an IP packet flow with a defined Quality of Service (QoS) between a packet gateway and a device. For example, there are Voice over Internet Protocol (VoIP) bearers that require a QoS with a minimum bit rate guarantee, File Transfer Protocol (FTP) bearers that requires a best effort QoS with a non-guaranteed bit rate, web browsing bearers with a best effort QoS, and other types of bearers. Low latency packets can have a low latency bearer, such as gaming, VoIP, and other applications that require lower latency. The packet can also be identified as being based on the low latency configuration based on the packet being received from a certain cell. For example, the packet can be identified as being a low latency packet when multiple packets are received from the certain cell. In particular, packets can be received from different cells, such as with carrier aggregation, and the device can be configured to receive low latency packets from one or more of the different cells.

At 1450, if the packet is based on the low latency configuration, a feedback packet can be transmitted in a following subframe n+p, where p<4. The following subframe n+p can be the $p^{th}$ subframe from the subframe n. For example, the feedback packet can be a hybrid automatic repeat request acknowledgement sent in the following subframe that is two subframes n+2 after the first subframe n in response to receiving the receiving the packet based on the low latency configuration in the first subframe n. The hybrid automatic repeat request acknowledgement can be transmitted in a temporal portion of the subframe including at least two symbols with resource elements assigned to the device for uplink feedback transmission. One symbol of the at least two symbols can be used for a pilot symbol and another symbol of the at least two symbols can be used for the hybrid automatic repeat request acknowledgement.

At 1460, if the packet is based on the normal latency configuration, a feedback packet can be transmitted in a following subframe n+4 when the received packet is based on the regular latency configuration. The following subframe n+4 can be the fourth subframe from the subframe n.

At 1470, the flowchart 1400 can end.

Figure 15:
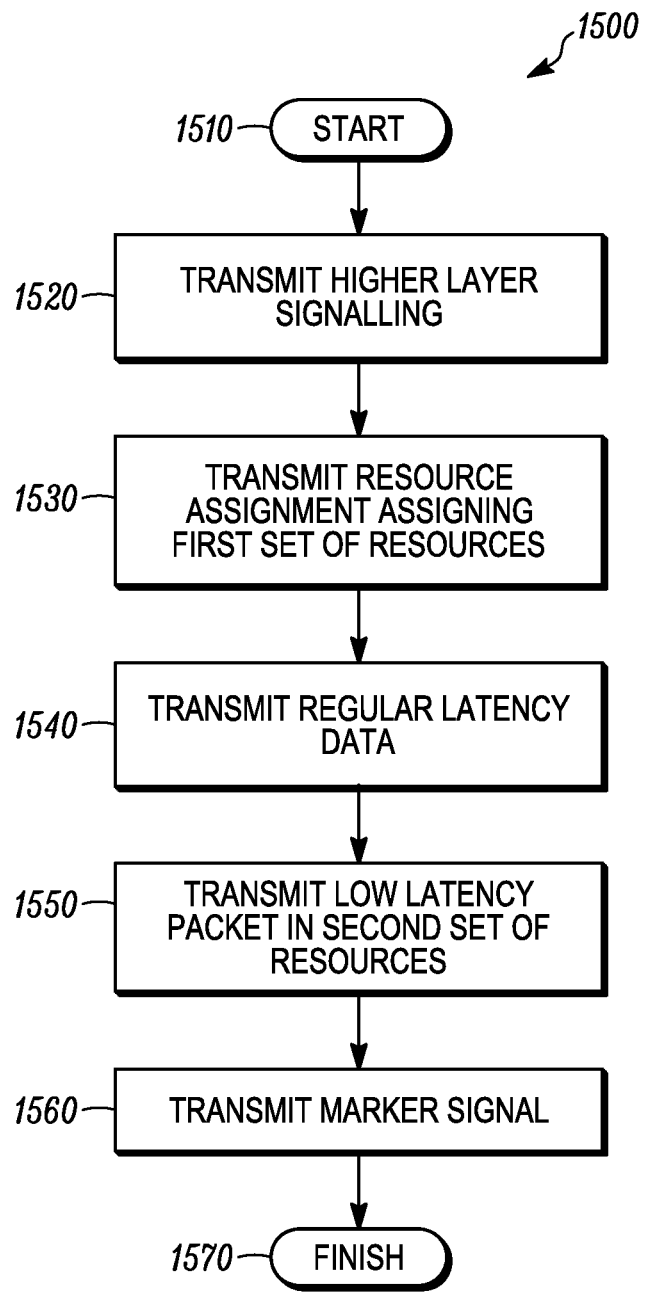
FIG. 15 is an example flowchart illustrating the operation of a device according to a possible embodiment.

FIG. 15 is an example flowchart 1500 illustrating the operation of a wireless communication device, such as the device 120, according to a possible embodiment. The method can be performed in a base station, such as an eNB, and/or can also be performed in any other device, such as a UE in a peer-to-peer network, an access point, or any other device that can transmit data. The flowchart 1500 describes, among other things, different features for signaling the existence and/or location of low latency data transmissions. Thus, all of the features are not necessary, as some may be redundant. At 1510, the flowchart 1500 can begin.

At 1520, higher layer signaling can be transmitted in a subframe. The higher layer can be a layer higher than a physical layer. The higher layer signaling can indicate a set of OFDM symbols where low latency data may be transmitted, a set of resource blocks where low latency data may be transmitted, a set of OFDM symbols where marker signal may be transmitted, and/or a set of resource elements where marker signal may be transmitted. The set can include just one symbol or block or can even be zero, such as empty.

At 1530, a resource assignment can be transmitted. The resource assignment can assign a first set of time-frequency resources in a subframe for regular latency data transmission. The subframe can be after the subframe in which the higher layer signaling is transmitted.

At 1540, regular latency data can be transmitted in resources within a first set of time-frequency resources in which low latency data is not transmitted. For example, regular latency data can be transmitted within at least some of the first set of time-frequency resources in which low latency data is not transmitted.

At 1550, low latency data can be transmitted within a second set of time-frequency resources in the subframe. The second set can at least partially overlap with the first set. The low latency data can have a lower latency than regular latency data. The low latency data within the second set of time-frequency resources may or may not occupy all of the resources in the second set.

At 1560, a marker signal can be transmitted. The marker signal can indicate a presence of low latency data transmission in the subframe. A higher layer can indicate where the marker can be transmitted, such as which of different candidate marker locations is being used. The marker signal can be transmitted in a subframe immediately following the subframe that includes the time-frequency resources. A control channel can be transmitted as the marker signal in the immediately following subframe. The control channel can indicate the presence of low latency data transmission in the subframe that includes the time-frequency resources. The marker signal can also be transmitted in the subframe where low latency data on the second set of time-frequency resources is transmitted.

The second set of time-frequency resources can include at least a set of OFDM symbols in the subframe and the marker signal can be transmitted in the at least one OFDM symbol of the set of OFDM symbols. For example, the marker signal can indicate a third set of time-frequency resources that include at least the time-frequency resources within the at least one OFDM symbol where low latency data is transmitted. The marker signal can also indicate the time-frequency resources within the at least one OFDM symbol where low latency data is transmitted. The marker signal can additionally indicate at least some of the time-frequency resources within the at least one OFDM symbol where low latency data is transmitted. The marker signal can be transmitted in a Low latency Channel Element (LCE) that can include a third set of time-frequency resources within the second set time-frequency resources. The third set of time-frequency resources can be within the at least one OFDM symbol.

The second set of time-frequency resources can be at least a set of OFDM symbols in the subframe and the marker signal can be transmitted in all OFDM symbols of the set of OFDM symbols. The first set of time-frequency resources can be a set of resource blocks in the subframe and the marker signal can be transmitted in at least one resource block of the set of resource blocks. For example, the marker signal can be transmitted in the last symbol of the in the at least one resource block of the set of resource blocks. The marker signal can also indicate the presence or absence of low latency data transmission in the subframe. At 1570, the flowchart 1500 can end.

Figure 16:
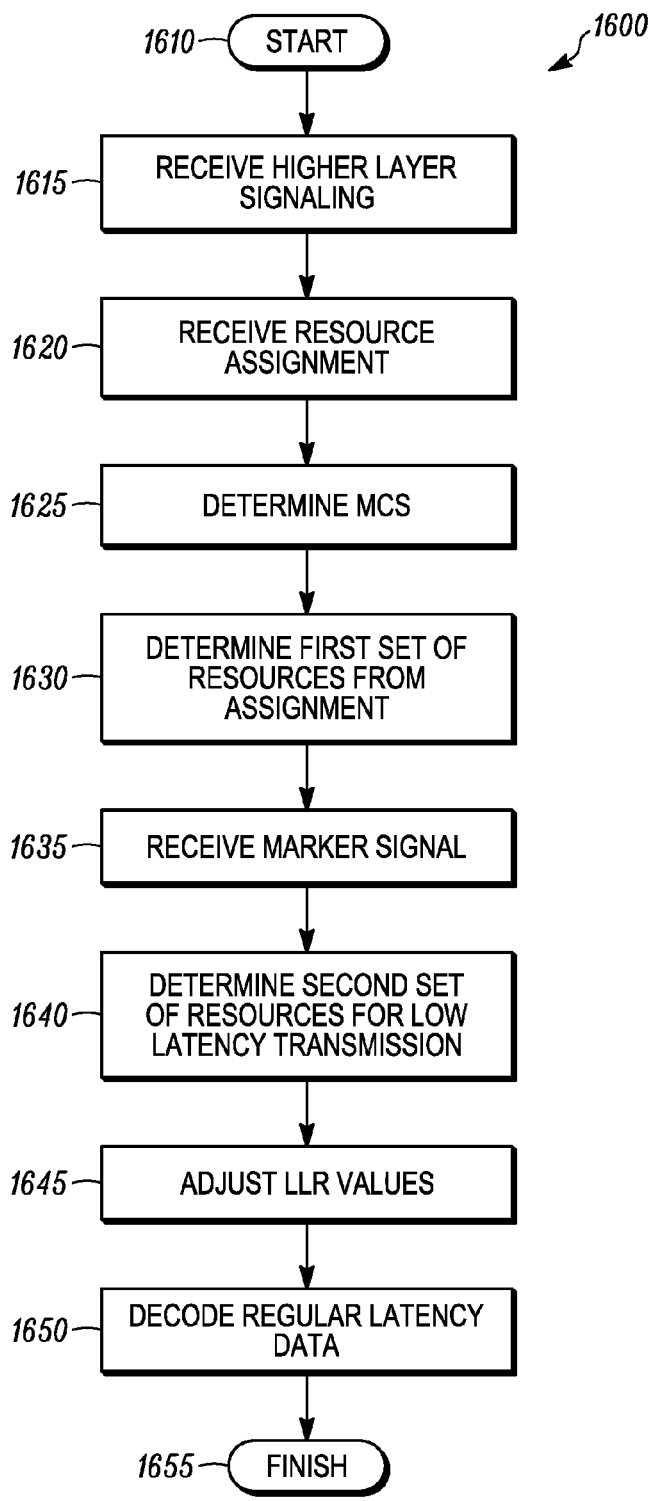
FIG. 16 is an example flowchart illustrating the operation of a device according to a possible embodiment.

FIG. 16 is an example flowchart 1600 illustrating the operation of a wireless communication device, such as the device 110, according to a possible embodiment. The flowchart 1600 describes, among other things, different features for determining the existence and/or location of low latency data transmissions. Thus, all of the features are not necessary, as some may be redundant. At 1610, the flowchart 1600 can begin.

At 1615, higher layer signaling can be received in a subframe, where the higher layer can be a layer higher than a physical layer. The higher layer signaling can indicate a set of OFDM symbols where low latency data may be transmitted, a set of resource blocks where low latency data may be transmitted, a set of OFDM symbols where a marker signal may be transmitted, and/or a set of resource elements where a marker signal may be transmitted. The set can be just one symbol or block and/or can be zero, such as empty.

At 1620, a resource assignment can be received. At 1625, a Modulation and Coding Scheme (MCS) value can be determined from the resource assignment. At 1630, a first set of time-frequency resources in a subframe can be determined from the resource assignment. The subframe can be a first subframe. The first set of time-frequency resources can include a set of resource blocks in the subframe.

At 1635, a marker signal can be received. The marker signal can be received in at least one resource block of the set of resource blocks. The marker signal can additionally be received in a second subframe immediately following the first subframe. The marker signal can also be received in the first subframe containing the first set of time-frequency resources. For example, the marker signal can be received in the at least one OFDM symbol of the first subframe. A control channel can be received as the marker signal in the second subframe. The control channel can indicate the presence of low latency data transmission in the first subframe. The marker signal can also indicate the presence or absence of low latency data transmission in the subframe.

At 1640, a second set of time-frequency resources in the subframe can be determined. The second set of time-frequency resources can be used for a low latency data transmission and can overlap with at least a portion of the first set of time-frequency resources. The second set of time-frequency resources can be determined based on the received marker signal. The second set of time-frequency resources can include at least a set of OFDM symbols in the subframe and the marker signal can be received in all OFDM symbols of the set of OFDM symbols. The marker signal received at 1635 can also indicate a third set of time-frequency resources. The third set of time-frequency can include at least the time-frequency resources within the at least one OFDM symbol where low latency data is received.

According to a possible implementation, a low latency data transmission can be successfully decoded on a third set of time-frequency resources in the subframe. Then, the second set of time-frequency resources can be determined as time-frequency resources belonging to both the first set of time-frequency resources and the third set of time-frequency resources.

At 1645, Log Likelihood Ratio (LLR) values can be adjusted. The adjusted LLR values can be values of bits corresponding to regular latency data transmission and mapped to the second set of time-frequency resources. Adjusting LLR values can include adjusting soft bit values. The LLR values can be set to zero. The LLR values may be adjusted only if the MCS value exceeds a MCS threshold. For example the MCS threshold can correspond to 16 QAM rate ¾. If the MCS determined from resource assignment is smaller than the threshold, the device may not adjust the LLR values.

At 1650, a regular latency data transmission in the subframe can be decoded based on the determined first and second set of time-frequency resources. The regular latency transmission can have a longer latency than the low latency transmission. The regular latency data transmission can be intended for the device. A low latency data transmission may or may not be intended for the device. The regular latency transmission in the subframe can be decoded based on the adjusted LLR. The regular latency transmission can also be decoded based on the zeroed bits corresponding to regular latency data transmission and mapped to the second set of time-frequency resources. Regular latency data can be decoded without accounting for the second set of resources when the MCS value is less than a threshold. For example, regular latency data can be received in resources within the first set of time-frequency resources in which low latency data is not transmitted and then the regular latency data can be decoded. As a further example, regular latency data in resources can be received within at least some of the first set of time-frequency resources in which low latency data is not received. The regular latency data can be received in at least some of the resources within the first set of time-frequency resources. For example, the device can determine an MCS value from the resource assignment and if the MCS is less than a MCS threshold it may not look for a marker and/or skips the step of determining a second set of resources, and can decode regular latency data without accounting for second set of resources. At 1655, the flowchart 1600 can end.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 17:
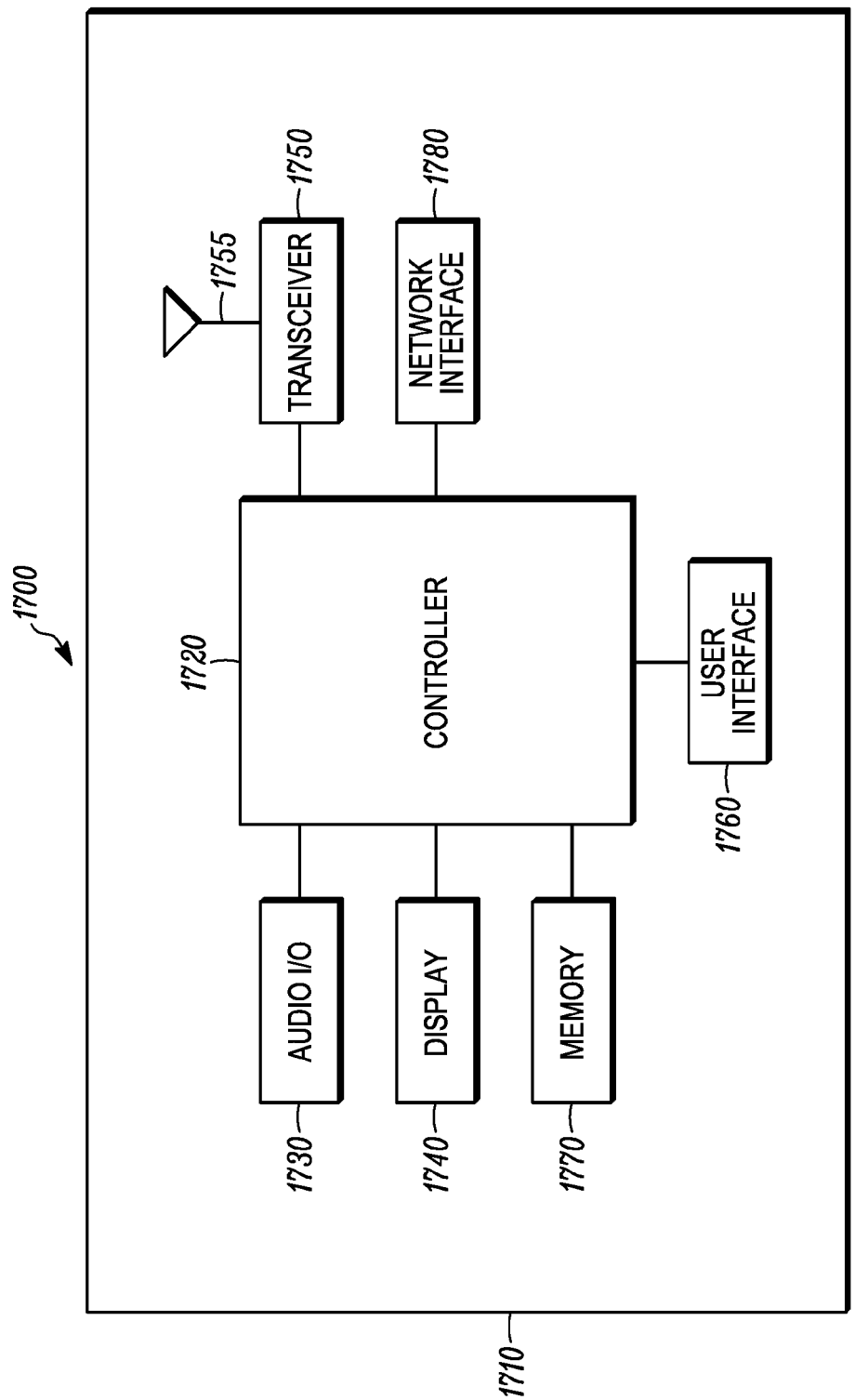
FIG. 17 is an example block diagram of an apparatus according to a possible embodiment.

FIG. 17 is an example block diagram of an apparatus 1700, such as the device 110, according to a possible embodiment. The apparatus 1700 can include a housing 1710, a controller 1720 within the housing 1710, audio input and output circuitry 1730 coupled to the controller 1720, a display 1740 coupled to the controller 1720, a transceiver 1750 coupled to the controller 1720, an antenna 1755 coupled to the transceiver 1750, a user interface 1760 coupled to the controller 1720, a memory 1770 coupled to the controller 1720, and a network interface 1780 coupled to the controller 1720. The elements of the apparatus 1700 can perform the device and apparatus methods and processes described in the disclosed embodiments.

The display 1740 can be a viewfinder, a liquid crystal display (LCD), a light emitting diode (LED) display, a plasma display, a projection display, a touch screen, or any other device that displays information. The transceiver 1750 can include a transmitter and/or a receiver. The audio input and output circuitry 1730 can include a microphone, a speaker, a transducer, or any other audio input and output circuitry. The user interface 1760 can include a keypad, a keyboard, buttons, a touch pad, a joystick, a touch screen display, another additional display, or any other device useful for providing an interface between a user and an electronic device. The network interface 1780 can be a universal serial bus port, an Ethernet port, an infrared transmitter/receiver, a USB port, an IEEE 1394 port, a WLAN transceiver, or any other interface that can connect an apparatus to a network or computer and that can transmit and receive data communication signals. The memory 1770 can include a random access memory, a read only memory, an optical memory, a flash memory, a removable memory, a hard drive, a cache, or any other memory that can be coupled to a wireless communication device.

The apparatus 1700 and/or the controller 1720 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1770 or elsewhere on the apparatus 1700. The apparatus 1700 and/or the controller 1720 may also use hardware to implement disclosed operations. For example, the controller 1720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1720 may be any controller or processor device or devices capable of operating an electronic device and implementing the disclosed embodiments.

According to a possible embodiment, the transceiver 1750 can receive a higher layer configuration message, where the higher layer can be higher than a physical layer. The controller 1720 can determine, based on the higher layer configuration message, a first region of a subframe for receiving data packets. The data packets in the first region can be low latency data packets that have a lower maximum latency than normal latency data packets in a second region. For example, the data packet comprises a low latency data packet with a latency lower than a normal data packet. The first region can be used for transmitting control signals for decoding normal latency data packets in the second region. The first region can be a first chronological region of a subframe, where the first region can include up to four multicarrier symbols. The first region can be a control region including at least one physical downlink control channel including control channel elements. The data packets can be received on one or more of the control channel elements including resource elements from the first set of resource elements.

The first region can include a first set of resource elements. The first set of resource elements can be a subset of a second set of resource elements in the first region, where the first region can be used for control channel monitoring. A number of resource elements in the first set can be less than a number of resource elements in the second set. The data packets can be mapped to at least one resource element of the first set of resource elements.

The controller 1720 can monitor the first region. Monitoring can include attempting to decode the data packets in the first region. For example, the controller 1720 can perform control channel monitoring in the first region. The controller 1720 can decode data in a data packet in the first region. The controller 1720 can deliver the decoded data from the data packet in the first region to an application layer. For example, the controller 1720 can determine successful decoding of a control channel in the first region using a first identifier and can determine successful decoding of data in the data packet in the first region using a second identifier. The first identifier can be a Cell Radio Network Temporary Identifier (C-RNTI) received in the higher layer configuration message and the second identifier can be a Low Latency Radio Network Temporary Identifier (low latency-RNTI) received in the higher layer configuration message.

The transceiver 1750 can transmit an acknowledgement in a subframe with a first offset from a subframe in which the low latency data packet is received in response to successful decoding of low latency data packet. The first offset can be different from a second offset used for normal latency data packets. For example, the first offset can be two and transmitting an acknowledgement can include transmitting a hybrid automatic repeat request acknowledgement in a subframe with a first offset of two subframes n+2 from the subframe n in which low latency data packet is received.

According to another related embodiment, the transceiver 1750 can receive a higher layer configuration message indicating a set of resource blocks for receiving data packets in at least one symbol of a subframe. The higher layer can be higher than a physical layer. The at least one symbol can be outside of a control region. The higher layer configuration message can also indicate a set of candidate symbols in the subframe. The at least one symbol can belong to the set of candidate symbols. The set of candidate symbols can be less than all of the symbols in the subframe.

The controller 1720 can attempt to decode a data packet in a first set of resource elements (LCE0) within the set of resource blocks, the first set of resource elements in the at least one symbol of the subframe. The first set of resource elements can be a subset of resource elements used for control channel monitoring in a subframe. The control channel can assign resources in a second region of the subframe for data.

The controller 1720 can attempt to decode the data packet in at least a second set of resource elements (LCE1) within the set of resource blocks. The second set of resource elements can be in the at least one symbol of the subframe. The second set of resource elements can include at least one resource element that is not in the first set of resource elements. A first number of resource elements in the first set of resource elements can be based on a first aggregation level. A second number of resource elements in the second set of resource elements can be based on a second aggregation level higher than the first aggregation level. Also, the second set of resource elements can include the first set of resource elements and additional resource elements. A number of the additional resource elements can be the same as the first number of resource elements in the first set of resource elements.

The controller 1720 can successfully decode the data packet in one of the first set of resource elements and the second set of resource elements. The subframe can be a first subframe and the transceiver 1750 can transmit an ACK, in response to decoding the first packet, in a time-frequency resource in a second subframe with a first offset to the first subframe, in response to successfully decoding the data packet.

Also, the higher layer configuration message can indicate a set of resource blocks for receiving low latency data packets in at least one symbol of a subframe, where the higher layer can be higher than a physical layer. The data packet can be a low latency data packet and the controller 1750 can attempt to decode control information in the subframe. The control information can assign resources for receiving a normal latency data packet, where the normal latency data packet has a longer latency that the low latency data packet. The controller 1750 can decode the normal latency data packet and the transceiver can then transmit an ACK/NACK in a third subframe with a second offset to the first subframe in response to decoding the normal latency data packet where the second offset is greater than the first offset. The controller 1720 can deliver a data payload of the decoded data packet to an application layer.

According to another related embodiment, the transceiver 1750 can receive a higher layer configuration. The higher layer configuration can be higher than a physical layer configuration. The higher layer configuration indicating can configured the apparatus 1700 with a low latency configuration for a low latency transmission mode in addition to a regular latency configuration for a regular latency transmission mode. The low latency transmission mode can have a shorter latency than the regular latency transmission mode.

The transceiver 1750 can receive a packet based on one of the low latency configuration and the regular latency transmission mode in subframe n. A code block size in a subframe for packets based on the low latency configuration can be smaller than a code block size for packets based on the regular latency configuration. A maximum timing advance value for the low latency configuration can be less than a maximum timing advance value for the regular latency configuration.

The controller 1720 can identify the packet as being based on the low latency configuration based on the packet being received on a given transport bearer. The controller 1720 can identify the packet as being on the low latency configuration based on the packet being received from a certain cell. The controller 17220 can also identify the packet as being based on the low latency configuration based on other characteristics of the packet and/or surrounding transmissions. A transport block of the low latency configuration can be smaller than a transport block for the regular latency configuration. The packet based on the low latency configuration can be received on a dedicated resource on a Physical Downlink Shared Channel (PDSCH).

The transceiver 1750 can transmit a feedback packet in a following subframe n+p, where p<4 when the received packet is based on the low latency configuration. The following subframe n+p can be the $p^{th}$ subframe from the subframe n. The feedback packet can be a hybrid automatic repeat request acknowledgement sent in the following subframe that is two subframes n+2 after the first subframe n in response to receiving the packet based on the low latency configuration in the first subframe n. The hybrid automatic repeat request acknowledgement can be transmitted in a temporal portion of the subframe including at least two symbols with resource elements assigned to the device for uplink feedback transmission. One symbol of the at least two symbols can be used for a pilot symbol and another symbol of the at least two symbols can be used for the hybrid automatic repeat request acknowledgement. The transceiver 1750 can transmit a feedback packet in a following subframe n+4 when the received packet is based on the regular latency configuration, where the following subframe n+4 can be the fourth subframe from the subframe n.

According to another possible embodiment, the transceiver 1750 can receive a resource assignment. The controller 1720 can determine a first set of time-frequency resources in a subframe from the resource assignment. The controller 1720 can determine a second set of time-frequency resources in the subframe. The second set of time-frequency resources can be used for a low latency data transmission. The second set of time-frequency resources can overlap with at least a portion of the first set of time-frequency resources. The transceiver 1750 can receive a regular latency data transmission in the subframe. The controller 1720 can decode the regular latency data transmission in the subframe based on the determined first and second set of time-frequency resources, where the regular latency transmission can have a longer latency than the low latency transmission.

According to another possible embodiment, the transceiver 1750 can monitor a first control channel in a first temporal portion of a subframe. The combination of the transceiver 1750 and the controller 1720 can also be considered to monitor control channels in a subframe in that the transceiver 1750 can receive the subframe and the controller 1720 can attempt to decode the control channels. The subframe can include a plurality of OFDM symbols in a time domain and a plurality of subcarriers in a frequency domain. The first control channel can occupy a first portion of subcarriers less than the plurality of subcarriers. The first control channel can assign data resources only in the first temporal portion of the subframe. The transceiver can monitor a second control channel in a second temporal portion of a subframe. The first temporal portion can occupy at least one different OFDM symbol in the subframe from the second temporal portion. The second temporal portion can also occupy at least one different OFDM symbol in the subframe from the first temporal portion. The second control channel can occupy a second portion of subcarriers that are less than the plurality of subcarriers. The second control channel can assign data resources only in the second temporal portion of the subframe. The controller 1720 can decode the first control channel. The transceiver 1750, in response to decoding the first control channel, can receive data in the first temporal portion of the subframe. The data in the first temporal portion can be assigned by the first control channel. The controller 1720 can decode the data.

Figure 18:
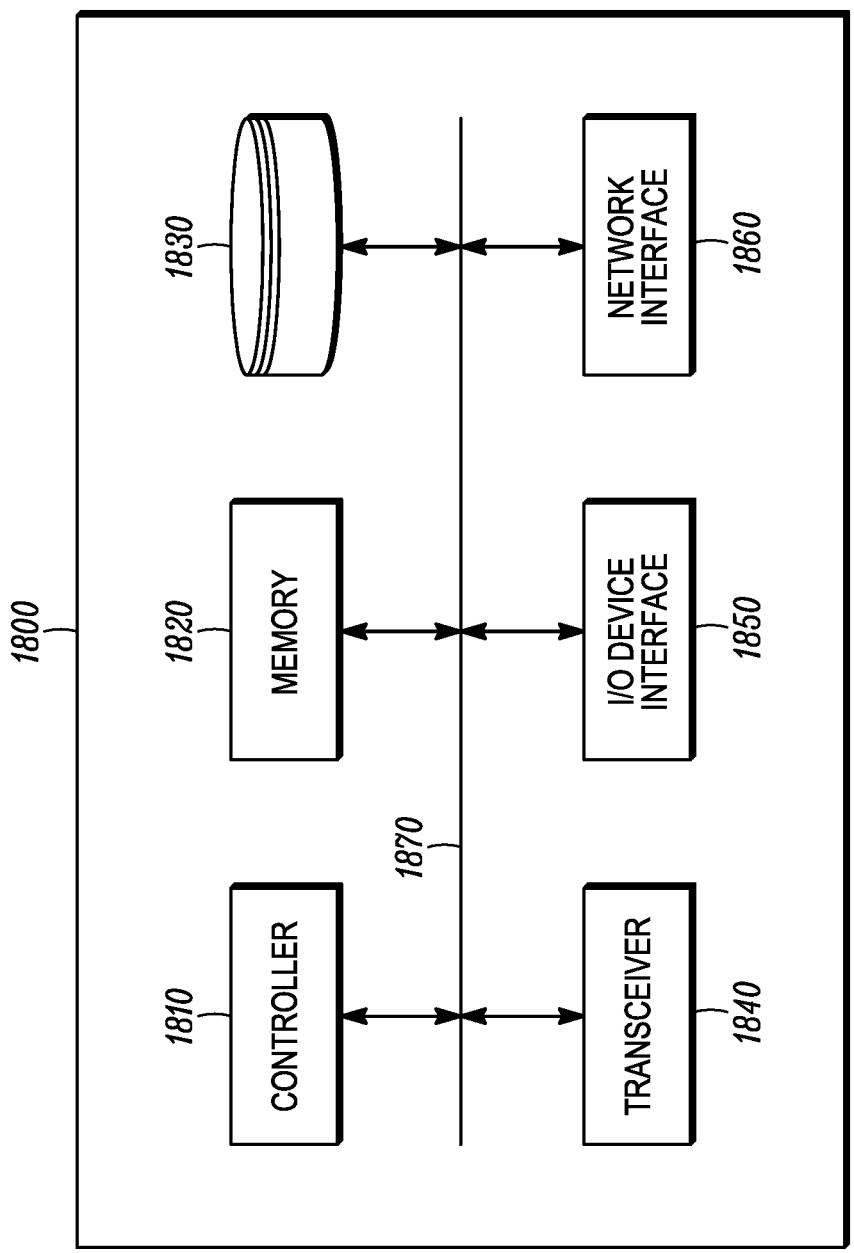
FIG. 18 is an example block diagram of a device according to a possible embodiment.

FIG. 18 is an example block diagram of a device 1800, such as the device 120, according to a possible embodiment. The device 1800 may include a controller 1810, a memory 1820, a database interface 1830, a transceiver 1840, Input/Output (I/O) device interface 1850, a network interface 1860, and a bus 1870. The device 1800 can implement any operating system, such as Microsoft Windows®, UNIX, or LINUX, for example. Device operation software may be written in any programming language, such as C, C++, Java or Visual Basic, for example. The device software can run on an application framework, such as, for example, a Java® server, a .NET® framework, or any other application framework.

The transceiver 1840 can create a data connection with the device 110. The controller 1810 can be any programmable processor. Disclosed embodiments can also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1810 can be any controller or processor device or devices capable of operating a device and implementing the disclosed embodiments.

The memory 1820 can include volatile and nonvolatile data storage, including one or more electrical, magnetic, or optical memories, such as a Random Access Memory (RAM), cache, hard drive, or other memory device. The memory 1820 can have a cache to speed access to specific data. The memory 1820 can also be connected to a Compact Disc-Read Only Memory (CD-ROM), Digital Video Disc-Read Only memory (DVD-ROM), DVD read write input, tape drive, thumb drive, or other removable memory device that allows media content to be directly uploaded into a system. Data can be stored in the memory 1820 or in a separate database. For example, the database interface 1830 can be used by the controller 1810 to access the database.

The I/O device interface 1850 can be connected to one or more input and output devices that may include a keyboard, a mouse, a touch screen, a monitor, a microphone, a voice-recognition device, a speaker, a printer, a disk drive, or any other device or combination of devices that accept input and/or provide output. The network connection interface 1860 can be connected to a communication device, modem, network interface card, a transceiver, or any other device capable of transmitting and receiving signals to and from a network. The components of the device 1800 can be connected via the bus 1870, may be linked wirelessly, or may be otherwise connected. The elements any of the device 1800 can perform the device and apparatus methods and processes described in the disclosed embodiments. For example, the device 1800 and/or the controller 1810 can generate the signals and the transceiver 1840 can transmit the signals that are received by the device 110.

According to a possible embodiment, the transceiver 1840 can transmit a resource assignment. The resource assignment can assign a first set of time-frequency resources in a subframe for regular latency data transmission. The transceiver 1840 can transmit low latency data within a second set of time-frequency resources in the subframe. The second set can at least partially overlap with the first set, where low latency data has a lower latency than regular latency data. The transceiver 1840 can transmit a marker signal, the marker signal indicating a presence of low latency data transmission in the subframe. The controller 1810 can also generate the resource assignment, configure the low latency data for transmission, and generate the marker signal.

According to a possible embodiment, the controller 1810 can configure a first control channel and a second control channel. The transceiver 1840 can transmit the first control channel in a first temporal portion of a subframe. The subframe can include a plurality of OFDM symbols in a time domain and a plurality of subcarriers in a frequency domain. The first control channel can occupy a first portion of subcarriers that are less than the plurality of subcarriers. The first control channel can assign first data resources only in the first temporal portion of the subframe. The transceiver 1840 can transmit the second control channel in a second temporal portion of a subframe. The second control channel can occupy a second portion of subcarriers that is less than the plurality of subcarriers. The first temporal portion can occupy at least one different first OFDM symbol in the subframe from the second temporal portion. The second temporal portion also can occupy at least one different second OFDM symbol in the subframe from the first temporal portion. The second control channel can assign second data resources only in the second temporal portion of the subframe.

The controller 1810 can also configure a third control channel. The transceiver 1840 can transmit the third control channel. The third control channel can occupy at least a third OFDM symbol in a third temporal portion in the subframe different from first temporal portion and the second temporal portion. The third control channel can assign third data resources in a fourth temporal portion different from the third temporal portion.

Figure 23:
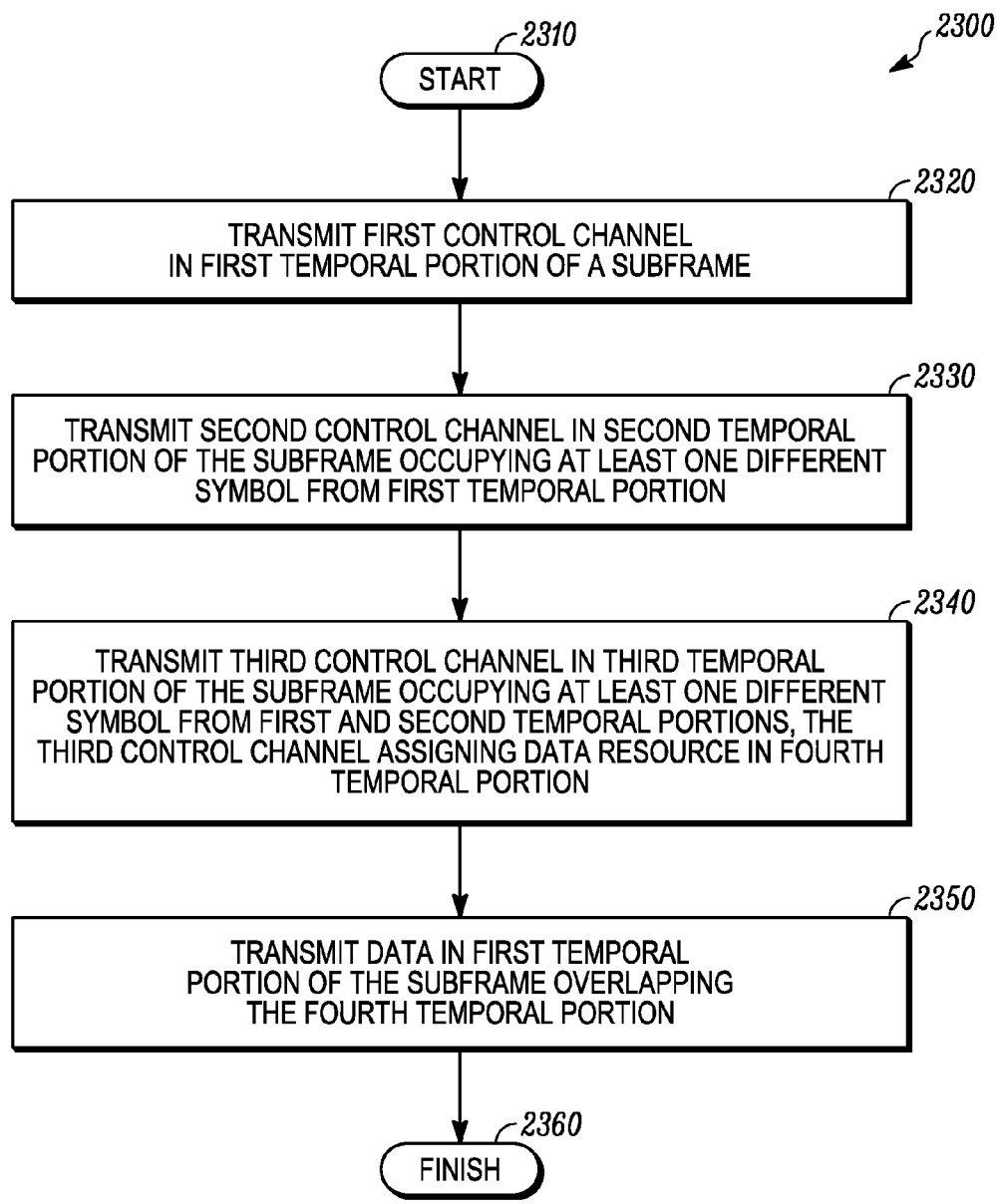
FIG. 23 is an example flowchart illustrating the operation of a device according to a possible embodiment.

FIG. 23 is an example flowchart 2300 illustrating the operation of a wireless communication device, such as the device 120, according to a possible embodiment. For example, the flowchart 2300 can be performed in a base station, such as an eNB, and/or can also be performed in any other device, such as a UE in a peer-to-peer network, an access point, or any other device that can transmit data. At 2310, the flowchart 2300 can begin.

At 2320, a first control channel can be transmitted in a first temporal portion of a subframe, such as in C2,D2 of the TTI 500 described above. The subframe can include a plurality of OFDM symbols in a time domain and a plurality of subcarriers in a frequency domain. The first control channel can occupy a first portion of subcarriers less than the plurality of subcarriers. The first control channel can assign first data resources only in the first temporal portion of the subframe.

At 1530 a second control channel can be transmitted in a second temporal portion of a subframe, such as in C1,D1, C3,D3, C4,D4, C5,D5, and/or C6,D6 of the TTI 500 described above. The first temporal portion can occupy at least one different first OFDM symbol in the subframe from the second temporal portion. The second temporal portion can occupy at least one different second OFDM symbol in the subframe from the first temporal portion. For example, the second temporal portion can occupy OFDM symbols in the subframe mutually exclusive from OFDM symbols occupied by the first temporal portion. The second control channel can occupy a second portion of subcarriers less than the plurality of subcarriers. The first portion of subcarriers and the second portion of subcarriers can be configured by higher layers than a physical layer. The second control channel can assign second data resources only in the second temporal portion of the subframe.

At 2330, a third control channel can be transmitted. The third control channel can occupy at least a third OFDM symbol in a third temporal portion in the subframe, such as the Legacy Control portion of the TTI 500 described above, different from first temporal portion and the second temporal portion, the third control channel assigning third data resources in a fourth temporal portion, such as the Legacy Allocation portion of the TTI 500 described above, different from the third temporal portion. The fourth temporal portion can include the first temporal portion and the second temporal portion. According to a possible implementation, the subframe can include a beginning OFDM symbol and the third temporal portion can include the beginning OFDM symbol in the subframe.

At 2350, data can be transmitted in the first data resources in the first temporal portion. The first temporal portion can overlap the fourth temporal portion. The data can correspond to the first control channel. For example, low latency data packet can be transmitted in the first data resources in the first temporal portion and the low latency data packet can have a shorter latency than a normal latency data packet transmitted in the third data resources in the fourth temporal portion. At 2360, the flowchart 2300 can end.

Figure 24:
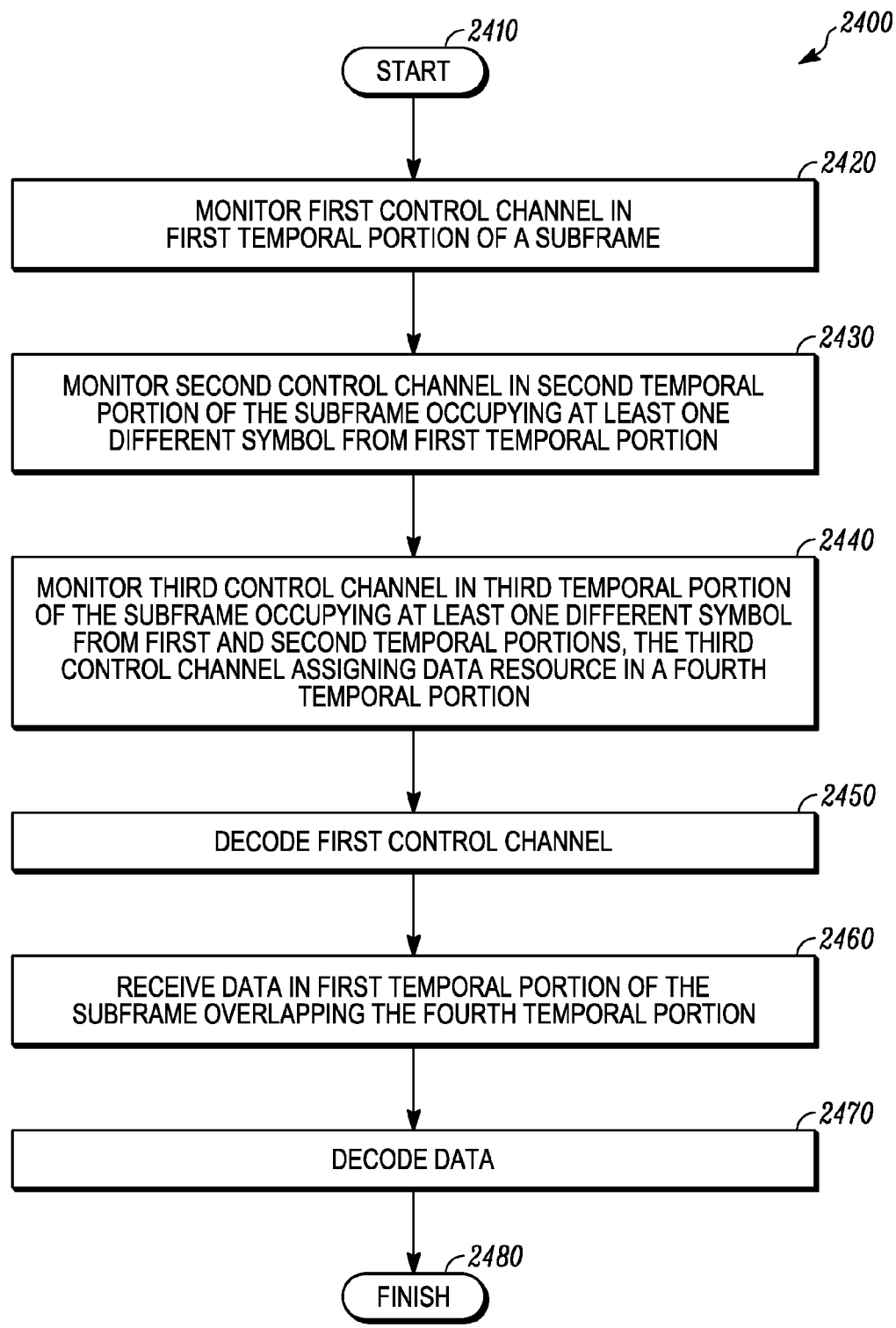
FIG. 24 is an example flowchart illustrating the operation of a device according to a possible embodiment.

FIG. 24 is an example flowchart 1600 illustrating the operation of a wireless communication device, such as the device 110, according to a possible embodiment. For example, the method can be performed in a device, such as a UE, and/or can also be performed in any other device that can receive data. At 2410, the flowchart 2400 can begin.

At 2420, a first control channel can be monitored in a first temporal portion of a subframe, such as in C2,D2 of the TTI 500 described above. The subframe can include a plurality of OFDM symbols in a time domain and a plurality of subcarriers in a frequency domain. The first control channel can occupy a first portion of subcarriers that is less than the plurality of subcarriers. The first control channel can assign data resources only in the first temporal portion of the subframe.

At 2430, a second control channel can be monitored in a second temporal portion of a subframe, such as in C1,D1, C3,D3, C4,D4, C5,D5, and/or C6,D6 of the TTI 500 described above. The second temporal portion can come before or after the first temporal portion in the time domain. The first temporal portion can occupy at least one OFDM symbol in the subframe different from the second temporal portion. The second temporal portion can occupy at least one OFDM symbol in the subframe different from the first temporal portion. For example, the second temporal portion can occupy mutually exclusive OFDM symbols in the subframe from OFDM symbols occupied by the first temporal portion. The second control channel can also occupy a second portion of subcarriers less than the plurality of subcarriers. The first portion of subcarriers and the second portion of subcarriers can be configured by higher layers than a physical layer. The second control channel can assign data resources only in the second temporal portion of the subframe.

At 2440, a third control channel can be monitored. The third control channel can occupy at least a third OFDM symbol in a third temporal portion in the subframe, such as the Legacy Control portion of the TTI 500 described above, different from first temporal portion and the second temporal portion. The subframe can include a beginning OFDM symbol and the third temporal portion can include the beginning OFDM symbol in the subframe. The third control channel can assign third data resources in a fourth temporal portion, such as the Legacy Allocation portion of the TTI 500 described above, different from the third temporal portion. The fourth temporal portion can include the first temporal portion and the second temporal portion.

At 2450, the first control channel can be decoded. At 2460, in response to decoding the first control channel, data can be received in the first temporal portion of the subframe. The data in the first temporal portion can be assigned by the first control channel. The data in the first temporal portion of the subframe can be on different subcarriers from the first control channel. For example, data can be received in the first data resources in the first temporal portion, where the first temporal portion can overlap the fourth temporal portion, and where the data can correspond to the first control channel. As a further example, low latency data packets can be received in the first data resources in the first temporal portion, where a low latency data packet in the first data resources in the first temporal portion has a shorter latency than a normal latency data packet in the third data resources in the fourth temporal portion. At 2470, the data can be decoded. At 2480, the flowchart 2400 can end.

Although not required, embodiments can be implemented using computer-executable instructions, such as program modules, being executed by an electronic device, such as a general purpose computer. Generally, program modules can include routine programs, objects, components, data structures, and other program modules that perform particular tasks or implement particular abstract data types. The program modules may be software-based and/or may be hardware-based. For example, the program modules may be stored on computer readable storage media, such as hardware discs, flash drives, optical drives, solid state drives, CD-ROM media, thumb drives, and other computer readable storage media that provide non-transitory storage aside from a transitory propagating signal. Moreover, embodiments may be practiced in network computing environments with many types of computer system configurations, including personal computers, hand-held devices, multi-processor systems, microprocessor-based or programmable consumer electronics, network personal computers, minicomputers, mainframe computers, and other computing environments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

The invention claimed is:

1. A method comprising:
   transmitting a first control channel in a first temporal portion of a subframe,
   the subframe comprising a plurality of Orthogonal Frequency Division Multiplexing (OFDM) symbols in a time domain and a plurality of subcarriers in a frequency domain, the first control channel occupying a first portion of subcarriers less than the plurality of subcarriers, and
   the first control channel assigning first data resources only in the first temporal portion of the subframe;
   transmitting a second control channel in a second temporal portion of the subframe,
   the first temporal portion occupying at least one different first OFDM symbol in the subframe from the second temporal portion,
   the second temporal portion occupying at least one different second OFDM symbol in the subframe from the first temporal portion,
   the second control channel occupying a second portion of subcarriers less than the plurality of subcarriers, and
   the second control channel assigning second data resources only in the second temporal portion of the subframe.

2. The method according to claim 1, wherein the first portion of subcarriers and the second portion of subcarriers are configured by higher layers than a physical layer.

3. The method according to claim 1, wherein the second temporal portion occupies mutually exclusive OFDM symbols in the subframe from OFDM symbols occupied by the first temporal portion.

4. The method according to claim 1, further comprising transmitting a third control channel, the third control channel occupying at least one third OFDM symbol in a third temporal portion in the subframe different from first temporal portion and the second temporal portion, the third control channel assigning third data resources in a fourth temporal portion different from the third temporal portion.

5. The method according to claim 4, wherein the subframe includes a beginning OFDM symbol and the third temporal portion includes the beginning OFDM symbol in the subframe.

6. The method according to claim 4, wherein the fourth temporal portion includes one selected from the group of the first temporal portion and the second temporal portion.

7. The method according to claim 6, further comprising transmitting data in the first data resources in the first temporal portion, where the first temporal portion overlaps the fourth temporal portion, the data corresponding to the first control channel.

8. The method according to claim 4, further comprising transmitting low latency data packet in the first data resources in the first temporal portion, where the low latency data packet has a shorter latency than a normal latency data packet transmitted in the third data resources in the fourth temporal portion.

9. A method comprising:
   monitoring a first control channel in a first temporal portion of a subframe,
   the subframe comprising a plurality of Orthogonal Frequency Division Multiplexing (OFDM) symbols in a time domain and a plurality of subcarriers in a frequency domain, the first control channel occupying a first portion of subcarriers less than the plurality of subcarriers, and
   the first control channel assigning data resources only in the first temporal portion of the subframe;
   monitoring a second control channel in a second temporal portion of the subframe,
   the first temporal portion occupying at least one different OFDM symbol in the subframe from the second temporal portion,
   the second temporal portion occupying at least one different OFDM symbol in the subframe from the first temporal portion,
   the second control channel occupying a second portion of subcarriers less than the plurality of subcarriers, and
   the second control channel assigning data resources only in the second temporal portion of the subframe;
   decoding the first control channel;
   in response to decoding the first control channel, receiving data in the first temporal portion of the subframe, the data in the first temporal portion assigned by the first control channel; and
   decoding the data.

10. The method according to claim 9, wherein the data in the first temporal portion of the subframe is on different subcarriers from the first control channel.

11. The method according to claim 9, wherein the first portion of subcarriers and the second portion of subcarriers are configured by higher layers than a physical layer.

12. The method according to claim 9, wherein the second temporal portion occupies mutually exclusive OFDM symbols in the subframe from OFDM symbols occupied by the first temporal portion.

13. The method according to claim 9, further comprising monitoring a third control channel, the third control channel occupying at least one third OFDM symbol in a third temporal portion in the subframe different from first temporal portion and the second temporal portion, the third control channel assigning third data resources in a fourth temporal portion different from the third temporal portion.

14. The method according to claim 13, wherein the subframe includes a beginning OFDM symbol and the third temporal portion includes the beginning OFDM symbol in the subframe.

15. The method according to claim 13, wherein the fourth temporal portion includes one selected from the group of the first temporal portion and the second temporal portion.

16. The method according to claim 15, further comprising receiving data in the first data resources in the first temporal portion, where the first temporal portion overlaps the fourth temporal portion, the data corresponding to the first control channel.

17. The method according to claim 13, further comprising receiving low latency data packets in the first data resources in the first temporal portion, where a low latency data packet has a shorter latency than a normal latency data packet in the third data resources in the fourth temporal portion.

18. An apparatus comprising:
   a controller to configure a first control channel and a second control channel; and
   a transceiver to transmit the first control channel in a first temporal portion of a subframe,
   the subframe comprising a plurality of Orthogonal Frequency Division Multiplexing (OFDM) symbols in a time domain and a plurality of subcarriers in a frequency domain, the first control channel occupying a first portion of subcarriers less than the plurality of subcarriers, and the first control channel assigning first data resources only in the first temporal portion of the subframe, the transceiver to transmit the second control channel in a second temporal portion of the subframe, the first temporal portion occupying at least one different first OFDM symbol in the subframe from the second temporal portion, the second temporal portion occupying at least one different second OFDM symbol in the subframe from the first temporal portion, the second control channel occupying a second portion of subcarriers less than the plurality of subcarriers, and the second control channel assigning second data resources only in the second temporal portion of the subframe.

19. The apparatus according to claim 18, wherein the controller configures a third control channel, and wherein the transceiver transmits the third control channel, the third control channel occupying at least one third OFDM symbol in a third temporal portion in the subframe different from first temporal portion and the second temporal portion, the third control channel assigning third data resources in a fourth temporal portion different from the third temporal portion.

20. An apparatus comprising:

a transceiver to monitor a first control channel in a first temporal portion of a subframe, the subframe comprising a plurality of Orthogonal Frequency Division Multiplexing (OFDM) symbols in a time domain and a plurality of subcarriers in a frequency domain, the first control channel occupying a first portion of subcarriers less than the plurality of subcarriers, and the first control channel assigning data resources only in the first temporal portion of the subframe, the transceiver to monitor a second control channel in a second temporal portion of the subframe, the first temporal portion occupying at least one different OFDM symbol in the subframe from the second temporal portion, the second temporal portion occupying at least one different OFDM symbol in the subframe from the first temporal portion, the second control channel occupying a second portion of subcarriers less than the plurality of subcarriers, and the second control channel assigning data resources only in the second temporal portion of the subframe; and a controller to decode the first control channel, wherein the transceiver, in response to decoding the first control channel, receives data in the first temporal portion of the subframe, the data in the first temporal portion assigned by the first control channel, and wherein the controller decodes the data.

* * * * *